(12) United States Patent
Baba et al.

(10) Patent No.: US 6,232,735 B1
(45) Date of Patent: May 15, 2001

(54) ROBOT REMOTE CONTROL SYSTEM AND ROBOT IMAGE REMOTE CONTROL PROCESSING SYSTEM

(75) Inventors: Katsuyuki Baba; Shigeaki Ino; Yoichi Takamoto, all of Kitakyushu (JP)

(73) Assignee: Thames Co., Ltd., Fukuoka-Ken (JP)

( * ) Notice: Subject to any disclaimer, the term of this patent is extended or adjusted under 35 U.S.C. 154(b) by 0 days.

(21) Appl. No.: 09/448,608

(22) Filed: Nov. 24, 1999

(30) Foreign Application Priority Data

Nov. 24, 1998 (JP) .................................................. 10-333128
Oct. 26, 1999 (JP) .................................................. 11-304739

(51) Int. Cl.[7] .................................................. G05B 19/10
(52) U.S. Cl. ...................................... 318/567; 318/568.12
(58) Field of Search .............................. 318/567, 568.11, 318/568.1, 568.12, 568.16, 568.2; 901/1, 6, 8, 9, 23, 47; 395/80, 82, 84

(56) References Cited

U.S. PATENT DOCUMENTS 5,841,258 * 11/1998 Takenaka ........................ 318/568.12
5,995,884 * 11/1999 Allen et al. ........................... 318/587

FOREIGN PATENT DOCUMENTS 7-295637    11/1995  (JP) .

* cited by examiner

*Primary Examiner*—Khanh Dang
(74) *Attorney, Agent, or Firm*—Sughrue, Mion, Zinn, Macpeak & Seas, PLLC

(57) ABSTRACT

The invention provides a robot remote control system by which a robot apparatus can be remotely controlled if it is placed anywhere at least in Japan, wherein the robot remote control system comprises a remote control apparatus (1) for remotely controlling a robot and a robot apparatus (2) controlled on the basis of data from the remote control apparatus, and the remote control apparatus has a first computer for generating control data of the robot apparatus, and a first mobile transmission device for transmitting control data to a base station connected to a public communications network while the robot apparatus has a second mobile transmission device for receiving the control data transmitted from the base station connected to a public communications network, and the second computer for controlling the robot mechanism by processing the control data.

9 Claims, 17 Drawing Sheets

ROBOT REMOTE CONTROL SYSTEM AND ROBOT IMAGE REMOTE CONTROL PROCESSING SYSTEM

TECHNICAL FIELD OF THE INVENTION

The present invention relates to a robot remote control system which executes remote control of a robot, and a robot image remote control processing system comprising the robot remote control system and an image remote processing system which remotely transmits images.

BACKGROUND OF THE INVENTION

As a prior art robot remote control system, there is, for example, a receiving and guiding robot system which is disclosed in Japanese Laid-Open Patent Publication No. 295637 of 1995.

In the receiving and guiding robot system described in the above publication, the robot body and peripheral control apparatus are mechanically connected to each other by a data transmitting and receiving portion and a sound transmitting and receiving portion, wherein data transmitting and receiving are performed by using infrared ray signals, and sound transmitting and receiving are carried out by FM signals.

SUMMARY OF THE INVENTION

However, in a receiving and guiding robot system proposed as a prior art robot remote control system, transmission between the robot body and a peripheral control device is enabled by infrared ray signals and/or FM signals. Therefore, it is impossible to use the system if both of these are spaced from each other by a fixed distance or more (for example, 100 m), whereby the robot system and its peripheral control device could not be used between remote locations such as Tokyo and Kitakyushu or the United States of America.

In this type of robot remote control system and robot image remote control processing system, it is requisite that remote control is possible even though a robot apparatus to be remotely controlled, and an image processing unit is disposed anywhere at least in Japan It is therefore an object of the invention to provide a robot remote control system which can be remotely controlled even though a robot apparatus to be remotely controlled is disposed anywhere at least in Japan, and a robot image remote control processing system which can be remotely controlled even though an image processing unit to be remotely controlled is disposed anywhere at least in Japan.

In order to achieve the above object, a robot remote control system of the invention is a robot remote control system comprising a remote control apparatus for remotely controlling a robot and a robot apparatus controlled on the basis of data provided by the remote control apparatus, wherein the remote control apparatus comprises a first computer which generates control data for said robot apparatus; and a first mobile transmission device which transmits the control data to a base station connected to a public communications network; and the robot apparatus comprises a second mobile transmission device for receiving the control data which is transmitted from the base station connected to the public communications network; and a second computer for processing said control data and for controlling a robot mechanism.

Therefore, a robot remote control system can be obtained, which can be remotely controlled even though a robot apparatus to be remotely controlled is placed anywhere in Japan.

In order to solve the object, a robot image remote control processing system of the invention is a robot image remote control processing system comprising a robot remote control system and an image remote processing system, wherein the robot remote control system has a robot remote control portion, a robot control portion, and a robot mechanism portion controlled by the robot control portion, and the image remote processing system has an image remote control portion and an image processing unit; the robot remote control portion has a first computer for generating action codes to provide action instructions to the robot control portion, and simultaneously control codes to control the image processing unit; a first data transmission card for converting the action codes and the control codes, which are outputted from the first computer, to first wireless transmission data; the robot control portion has a second mobile transmission device for receiving the first electric wave signals via an antenna and outputting the first wireless transmission data; a second data transmission card for converting the first wireless transmission data to the action codes and the control codes; a second computer for outputting the action codes and control codes by inputting the action codes and control codes from the second data transmission card; and a robot sequencer control portion for providing motions to the robot mechanism portion, which carries out forward or backward motions and left- and right-turning actions, etc., on the basis of the action codes outputted from the second computer, and at the same time, for outputting the control codes, as they are, which are outputted from the second computer; the robot mechanism portion has a plurality of cameras for photographing the surrounding objects and outputting these as analog image signals; and an image selecting portion for selecting and outputting analog image signals from a plurality of cameras on the basis of control codes outputted from a robot sequencer control portion of the robot control portion; the image remote control portion has an image sound converting portion for converting analog sound signals to digital sound signals or vice versa, and converting digital image signals to analog image signals; a third computer for outputting image transmission instruction data along with inputting and outputting digital sound signals and digital image signals; a third data transmission card for converting digital sound signals and image transmission instruction data outputted from the third computer to second wireless transmission data; and a third mobile transmission device for transmitting the second wireless transmission data via an antenna as second electric wave signals; and the image processing unit has a fourth mobile transmission device for outputting the second wireless transmission data upon receiving the second electric wave signals via an antenna; a fourth data transmission card for converting digital image signals to the third wireless transmission data along with converting the second wireless transmission data to digital sound signals; a fourth computer for outputting digital image signals along with inputting and outputting digital sound signals from the fourth data transmission card; an image sound converting portion for converting analog image signals from. the image selecting portion to digital image signals and outputting the same to a fourth computer along with converting digital sound signals outputted from the fourth computer to analog sound signals or analog sound signals from a microphone to digital sound signals.

Therefore, a robot image remote control processing system can be obtained, which can be remotely controlled even though an image processing unit to be remotely controlled is placed anywhere at least in Japan.

BRIEF DESCRIPTION OF THE DRAWINGS

The foregoing and other features and advantages of the present invention will become more readily appreciated as the same becomes better understood by reference to the following detailed description when taken in conjunction with the accompanying drawings wherein.

DETAILED DESCRIPTION OF PREFERRED EMBODIMENTS OF THE INVENTION

Figure 1:
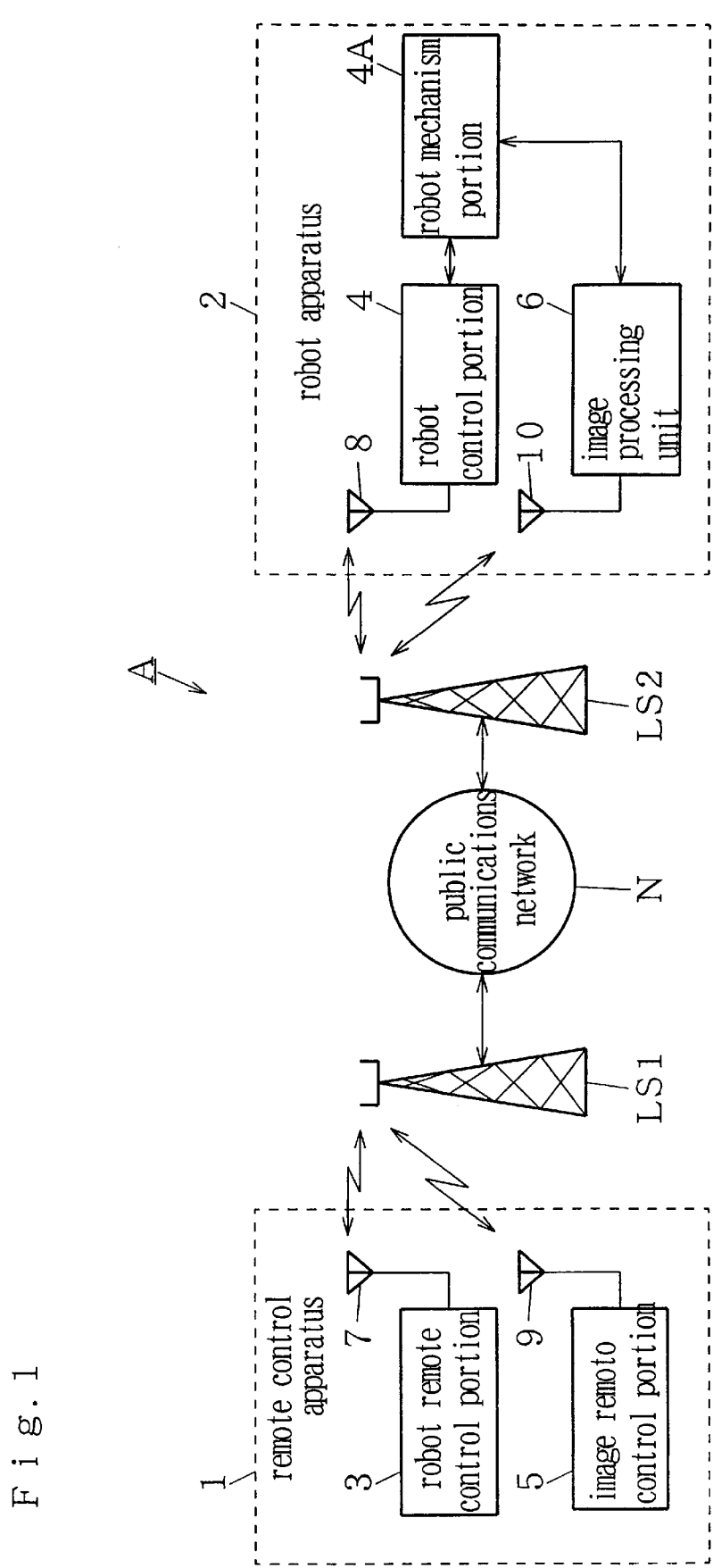
FIG. 1 is a block diagram showing a robot image remote control processing system including a robot remote control system according to a first preferred embodiment of the invention.

A robot remote control system according to a first aspect of the invention comprises a remote control apparatus for remotely controlling a robot and a robot apparatus controlled on the basis of data transmitted from said remote control apparatus; wherein the remote control apparatus comprises a first computer which generates control data for the robot apparatus; and a first mobile transmission device which transmits the control data to a base station connected to a public communications network; and the robot apparatus comprises a second mobile transmission device for receiving the control data which is transmitted from the base station connected to the public communications network; and a second computer for processing the control data and for controlling a robot mechanism.

Therefore, since control data are transmitted from a remote control apparatus via amobile transmission device, such an action can be obtained, by which a robot apparatus can be remotely controlled even though the robot apparatus to be controlled is placed anywhere at least in Japan.

A robot remote control system according to a second aspect of the invention comprises a robot remote control portion; a robot control portion; and a robot mechanism portion controlled by the robot control portion; wherein the robot remote control portion comprises a first computer for generating action codes to instruct action instructions to the robot control portion; a first data transmission card for converting the action codes, outputted from the first computer, to wireless transmission data; and a first mobile transmission device for transmitting the wireless transmission data via an antenna as electric wave signals; the robot control portion comprises a second mobile transmission device for receiving the electric wave signals via an antenna and outputting the wireless transmission data; a second data transmission card for converting the wireless transmission data to the action codes; a second computer for receiving the action codes from the second data transmission card and outputting the same action codes; a robot sequencer control portion for providing motions to the robot mechanism portion which carries out forward or backward actions or left- or right-turning actions, on the basis of the action codes outputted from the second computer.

Therefore, since action instruction signals are transmitted from a robot remote control portion via a mobile transmission device (for example, a PHS device), such an action can be obtained, by which a robot mechanism portion can be controlled by a robot remote control portion even though a robot control portion to be controlled is placed anywhere at least in Japan. Further, as far as transmission or communication is available, further action can be obtained, by which an operator being remote from the site can freely operate the robot mechanism portion of a robot apparatus even though the robot apparatus is at a remarkably dangerous position.

A robot remote control system according to a third aspect of the invention has, in the robot remote control systems according to the first or second aspects of the invention or a first computer comprising an input device for inputting an action instruction provided for the robot control portion; a RAM for storing data; a ROM for storing programs and data; a central processing unit for converting an action instruction to an action code; a display for displaying the action instruction and the action code; and an interface portion for outputting the action code to peripheral devices.

Therefore, in addition to the actions obtained by the robot remote control systems according to the first and second aspects of the invention, the following action can be obtained. That is, if an action instruction is inputted via an input device, the robot mechanism portion can be automatically controlled by a robot control portion.

A robot remote control system according to a fourth aspect of the invention has, in addition to a robot remote control system according to the third aspect of the invention, a central processing unit having an action code retrieving means which retrieves an action code in an action code table, in which the action code corresponding to the action instruction is stored, when the action instruction is provided, and reads out the retrieved action code therefrom.

Therefore, in addition to the actions obtained in the robot remote control system according to the third aspect of the invention, the following action can be obtained. That is, an action code can be automatically generated when an action instruction is issued, and the robot mechanism portion can be automatically controlled.

A robot remote control system according to a fifth aspect of the invention has, in the robot remote control system according to the second aspect of the invention, a robot sequencer control portion including an action instruction retrieving means which retrieves an action code in an action instruction table, in which the action instruction corresponding to the action code is stored, when the action code is inputted, and reads out the retrieved action instruction.

Accordingly, in addition to the actions obtained in the robot remote control system according to the second aspect of the invention, such an action can be obtained, by which the robot mechanism portion can be automatically controlled by a robot sequencer control portion.

A robot remote control system according to a sixth aspect of the invention is a robot remote control system having a remote control apparatus and a robot apparatus, wherein the remote control apparatus comprises an operation apparatus including a head portion operating portion, an arm operating portion and a travel operating portion which, respectively operate the head portion, arm and finger portion and travelling portion of the robot apparatus; a first computer for generating operation data corresponding to an amount of operation in the operation apparatus; and a first mobile transmission device for transmitting the operation data from the first computer to a base station connected to a public communications network; and the robot apparatus comprises a second mobile transmission device for receiving the operation data from the base station connected to the public communications network; a second computer for generating control data for the head portion; arm and finger portion and travel portion on the basis of the operation data; and a robot mechanism portion for providing actions to the head portion, arm and finger portion and travel portion by driving a head portion motor, an arm and finger motor, and a travel motor in a motor portion on the basis of the control data.

Therefore, since operation data are transmitted from the remote control apparatus via a mobile transmission device, the robot apparatus converts the operation data to control data upon receiving the operation data, whereby the head portion, arm and finger portion, and travel portion of the robot mechanism portion can make actions on the basis of the control data.

A robot remote control system according to a seventh aspect of the invention is a robot remote control system according to the sixth aspect of the invention, wherein the robot mechanism portion has an arm and finger position detecting portion in the arm and finger portion, for detecting the present arm position and present finger position, a head position detecting portion in the head portion for detecting the present head position, and a finger reaction detecting portion for detecting a reaction force at a finger portion in the arm and finger portion; the second computer controls the positions of the arm and finger portion including the finger portion and the head portion on the basis of the present arm position, present finger position and present head position, and at the same time transmits the detected reaction force, which is a reaction force detected by the reaction force detecting portion, to the remote control apparatus via the second mobile transmission device; and the first computer provides the finger operating portion in the arm and finger operating portion with a load on the basis of the detected reaction force received via the first mobile transmission device.

Thereby, in addition to the actions obtained in a robot remote control system according to the sixth aspect of the invention, the positions of the head portion, and arm and finger portion can precisely be controlled by a feedback control, and finger operations having a real sense of feeling can be carried out by controlling the load of the finger portion on the basis of a reaction force at the finger portion.

A robot image remote control processing system according to an eighth aspect of the invention is a robot image remote control processing system comprising a robot remote control system and an image remote processing system, wherein the robot remote control system has a robot remote control portion, a robot control portion, and a robot mechanism portion controlled by the robot control portion, and the image remote processing system has an image remote control portion and an image processing unit; the robot remote control portion has a first computer for generating action codes to provide action instructions to the robot control portion, and simultaneously control codes to control the image processing unit; a first data transmission card for converting the action codes and the control codes, which are outputted from the first computer, to first wireless transmission data; and a first mobile transmission device for transmitting the first wireless transmission data via an antenna as the first electric wave signals, and the robot control portion has a second mobile transmission device for receiving the first electric wave signals via an antenna and outputting the first wireless transmission data; a second data transmission card for converting the first wireless transmission data to the action codes and the control codes; a second computer for outputting the action codes and control codes by inputting the action codes and control codes from the second data transmission card; a robot sequencer control portion for providing motions to the robot mechanism portion, which carries out forward or backward motions and left- and right-turning actions, etc., on the basis of the action codes outputted from the second computer, and at the same time, for outputting the control codes, as they are, which are outputted from the second computer; the robot mechanism portion has a plurality of cameras for photographing the surrounding objects and outputting these as analog image signals; and an image selecting portion for selecting and outputting analog image signals from a plurality of cameras on the basis of control codes outputted from a robot sequencer control portion of the robot control portion; the image remote control portion has an image sound converting portion for converting analog sound signals to digital sound signals or vice verse, and converting digital image signals to analog image signals; a third computer for outputting image transmission instruction data along with inputting and outputting digital sound signals and digital image signals; a third data transmission card for converting digital sound signals and image transmission instruction data outputted from the third computer to second wireless transmission data; and a third mobile transmission device for transmitting the second wireless transmission data via an antenna as second electric wave signals; and the image processing unit has a fourth mobile transmission device for outputting the second wireless transmission data upon receiving the second electric transmission signals via an antenna; a fourth data transmission card for converting digital image signals to the third wireless transmission data along with converting the second wireless transmission data to digital sound signals; a fourth computer for outputting digital image signals along with inputting and outputting digital sound signals from the fourth data transmission card; an image sound converting portion for converting analog image signals from the image selecting portion to digital image signals and outputting the same to the fourth computer along with converting digital sound signals outputted from the fourth computer to analog sound signals or analog sound signals from a microphone to digital sound signals.

Thereby, since an action instruction is transmitted from a robot remote control portion via a mobile transmission device (for example, a PHS device), the robot mechanism portion can be controlled by the robot remote control portion even though a robot control portion to be controlled is placed anywhere at least in Japan, and at the same time, image signals can be automatically transmitted from the image processing unit to the image remote control portion, displayed on a monitor display, and any one of a plurality of cameras installed at the robot mechanism portion can be selected.

A robot image remote control processing system according to a ninth aspect of the invention is a robot image remote control processing system according to the eighth aspect of the invention, wherein the plurality of cameras are placed at the head portion, leg portion and hand portion of the robot mechanism portion.

Therefore, in addition to the actions obtained in a robot image remote control processing system according to the eighth aspect of the invention, images generated at the head portion, leg portion and hand portion of the robot mechanism portion can be monitored.

Hereinafter, a description is given of preferred embodiments of the invention with reference to the drawings FIG. 1 through FIG. 20.

(Embodiment 1)

FIG. 1 is a block diagram showing a robot image remote control processing system including a robot remote control system according to a first preferred embodiment of the invention.

In FIG. 1, A is a robot remote control processing system, 1 is a remote control apparatus, 2 is a robot apparatus, 3 is a robot remote control portion, 4 is a robot control portion, 4A is a robot mechanism portion, 5 is an image remote control portion, 6 is an image processing unit, 7, 8, 9, and 10 are antennas, LS1 and LS2 are base stations (for example, PHS base stations), and N is the public communications network. The robot remote control portion 3, antennas 7 and 8, base stations LS1 and LS2, public communications network N, robot control portion 4 and robot mechanism portion 4A constitute a robot remote control system while the image remote control portion 5, antennas 9 and 10, base stations LS1 and LS2, public communications network N, and image processing unit 6 constitute an image remote processing system. And, the robot remote control system and image remote processing system further constitute a robot image remote control processing system A.

A description is given of the actions of the robot image remote control processing system A thus constructed.

Electric wave signals including action codes and control codes, which are outputted from the robot remote control system 3, are outputted to the robot control portion 4 via the antenna 7, base station LS1, public communications network N, base station LS2, and antenna 8 as electric wave signals, and the electric wave signals are converted to action codes and control codes in the robot control portion 4, and the action codes are further converted to relay signals which indicate the objective relays to be controlled. And, the robot mechanism portion 4A makes actions in compliance with relay signals. Further, the robot mechanism portion 4A is controlled in compliance with the control codes. The robot mechanism portion 4A has a plurality of cameras and an image selection portion 6, described later, which selects any one of the plurality of cameras, wherein output signals of the image selection portion 6 are inputted into the image processing unit 6.

Figure 2:
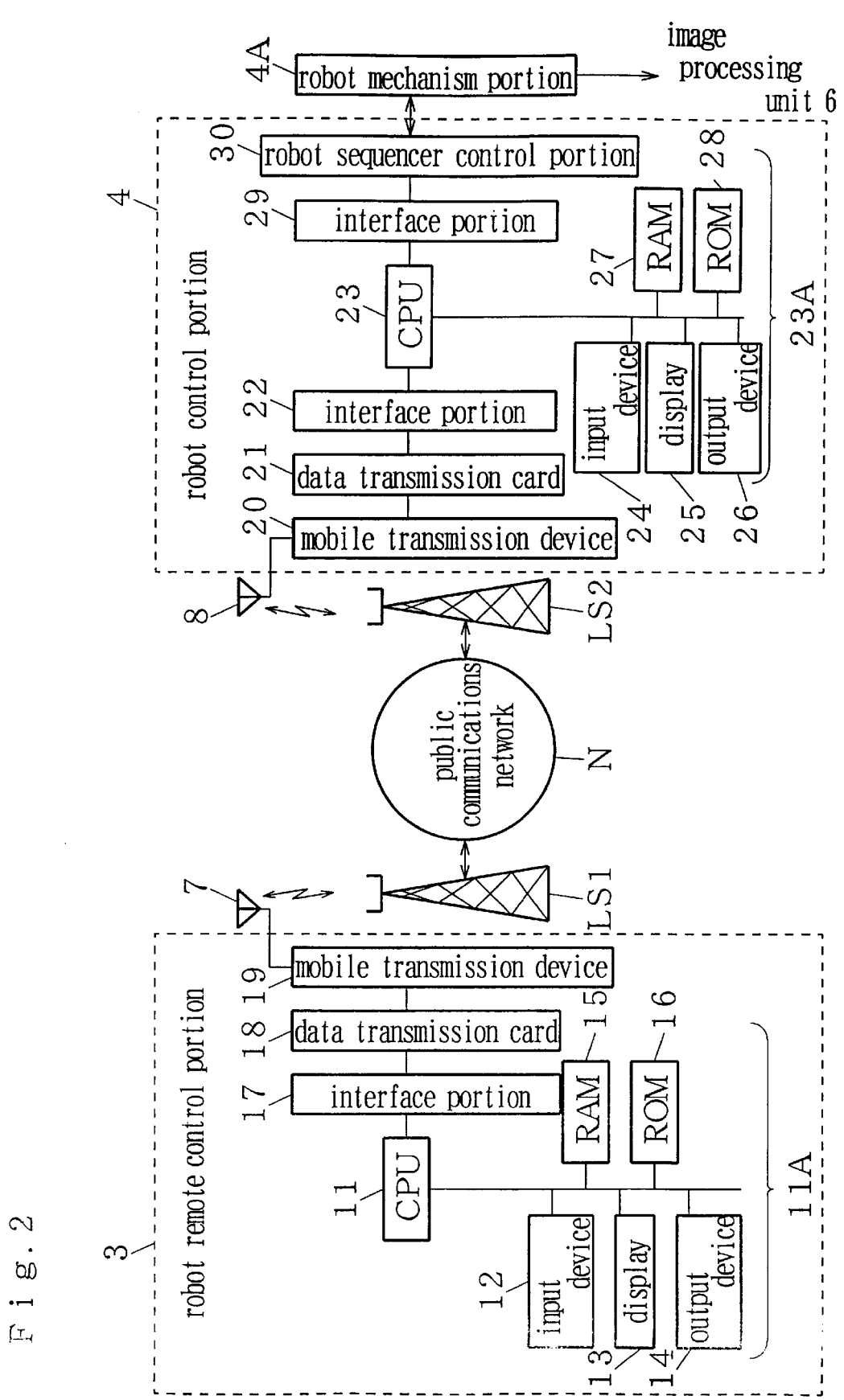
FIG. 2 is a block diagram showing a robot remote control system of FIG. 1.

FIG. 2 is a block diagram showing the robot remote control system illustrated in FIG. 1.

In FIG. 2, robot remote control portion 3, robot control portion 4, robot mechanism 4A, antennas 7 and 8, base stations LS1 and LS2 and public communications network N are similar to those shown in FIG. 1, wherein these components are given the same reference numbers, and description thereof is omitted. 11 is a CPU (central processing unit) which converts action instructions coming from an input device 12 to action codes, 13 is a display to indicate action instructions and action codes, 14 is an output device to output data, etc., to a printer, etc., 15 is a RAM which stores data, 16 is a ROM which stores programs, data, etc., and 17 is an interface portion to output the action codes to peripheral devices. These components constitute the first computer 11A. 18 is the first data transmission card which converts action codes outputted from the first computer 11A to wireless transmission data, 19 is the first mobile transmission device which transmits wireless transmission data from the first data transmission card 18 via the antenna 7 as electric wave signals (the first electric wave signals), 20 is the second mobile transmission device which outputs wireless transmission data upon receiving the electric wave signals outputted from the first mobile transmission device 19 via the antenna 8, 21 is the second data transmission card which converts wireless transmission data from the second mobile transmission device to action codes, and 23A is the second computer which inputs the action codes from the second data transmission card 21 via an interface portion 22.

The second computer 23A includes interface portions 22 and 29 which are in charge of acceptance and transfer of data, a CPU 23 for processing data, an input device 24 for inputting instructions, etc., a display 25 for displaying data, an output device 26 for outputting data to a printer, etc., a RAM 27 for storing data, and a ROM 28 for storing programs and data. 30 is a robot sequencer control portion which provides motions to the robot mechanism portion 4A which carries out forward motions, backward motions, left- and right-turning motions, on the basis of the action codes outputted from the second computer 23A.

Figure 4:
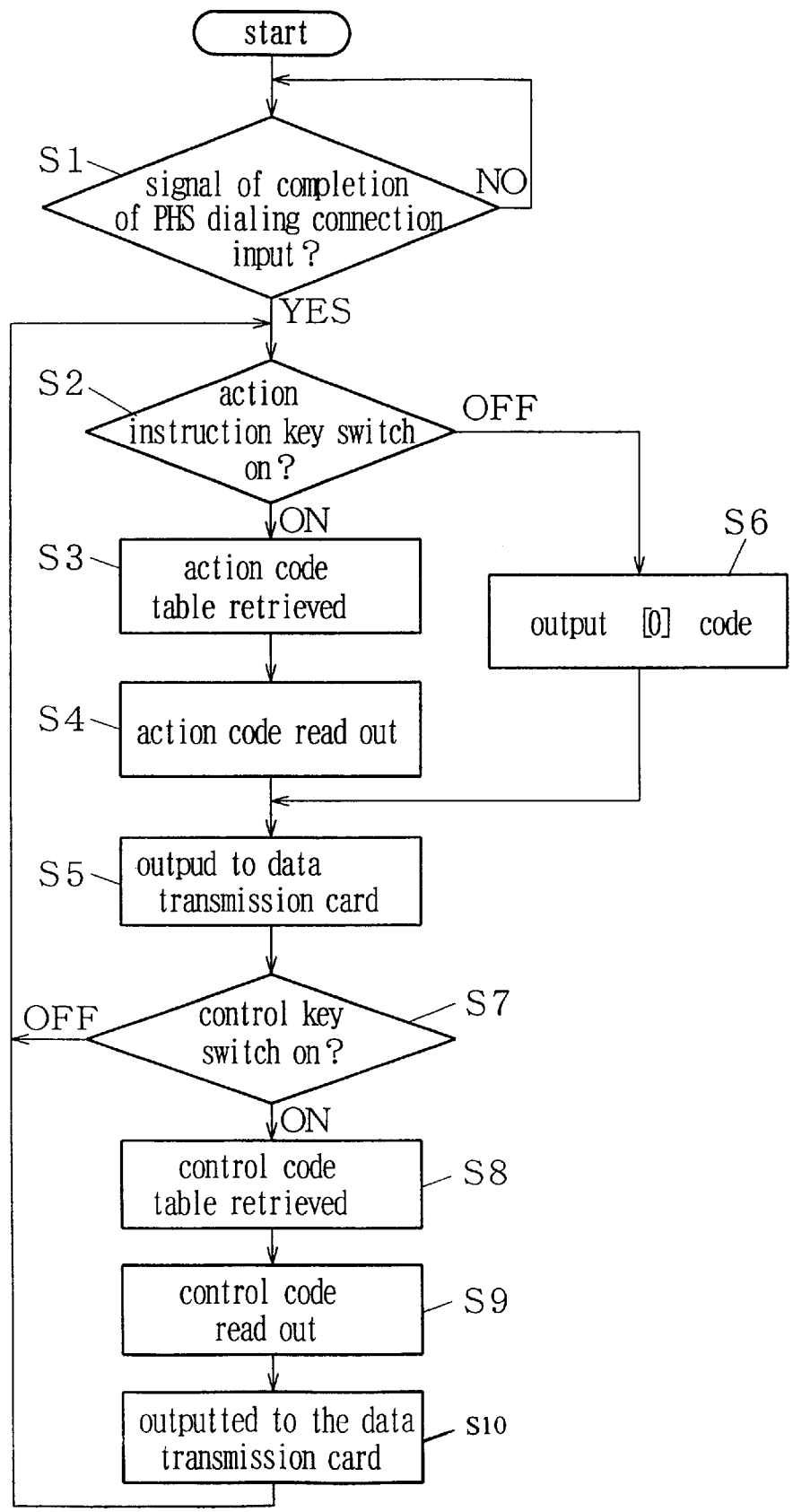
FIG. 4 is a flow chart showing motions in a robot remote control portion.
Figure 5:
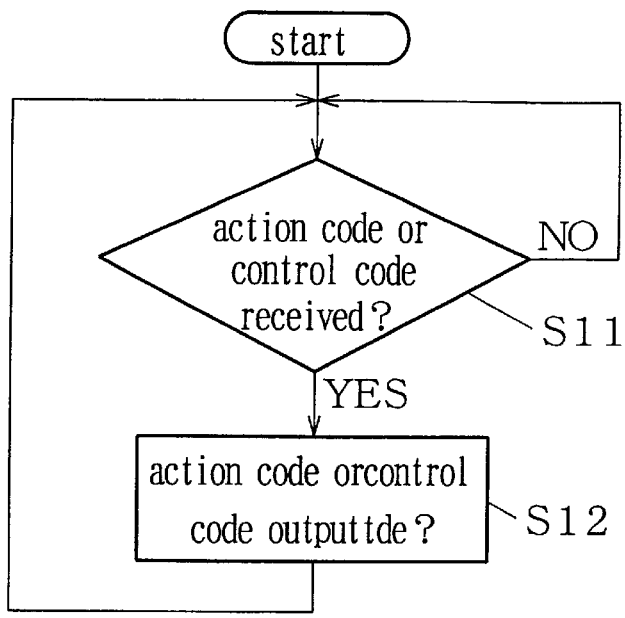
FIG. 5 is a flow chart showing motions in a robot control portion.
Figure 6:
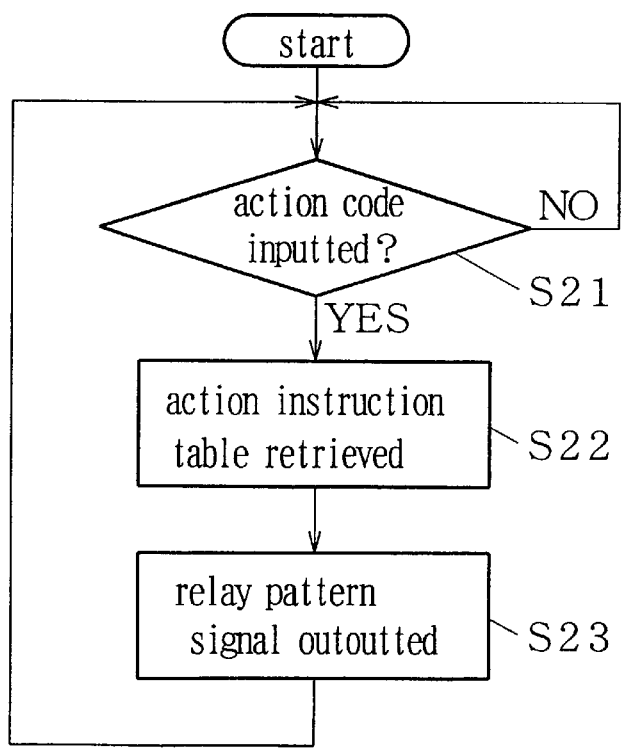
FIG. 6 is a flow chart showing motions in a robot sequencer control portion of the robot control portion.
Figure 7:
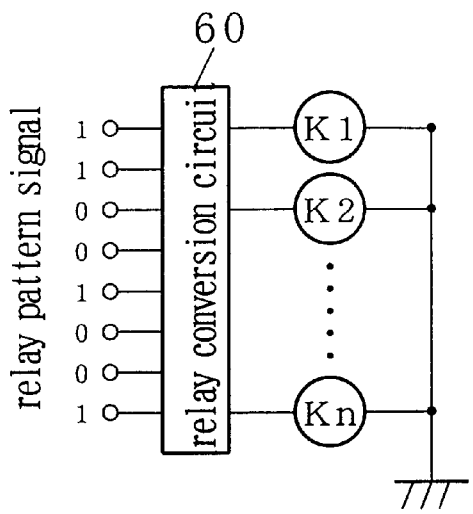
FIG. 7 is a circuit diagram showing a relay conversion circuit in the robot sequencer control portion.
Figure 8:
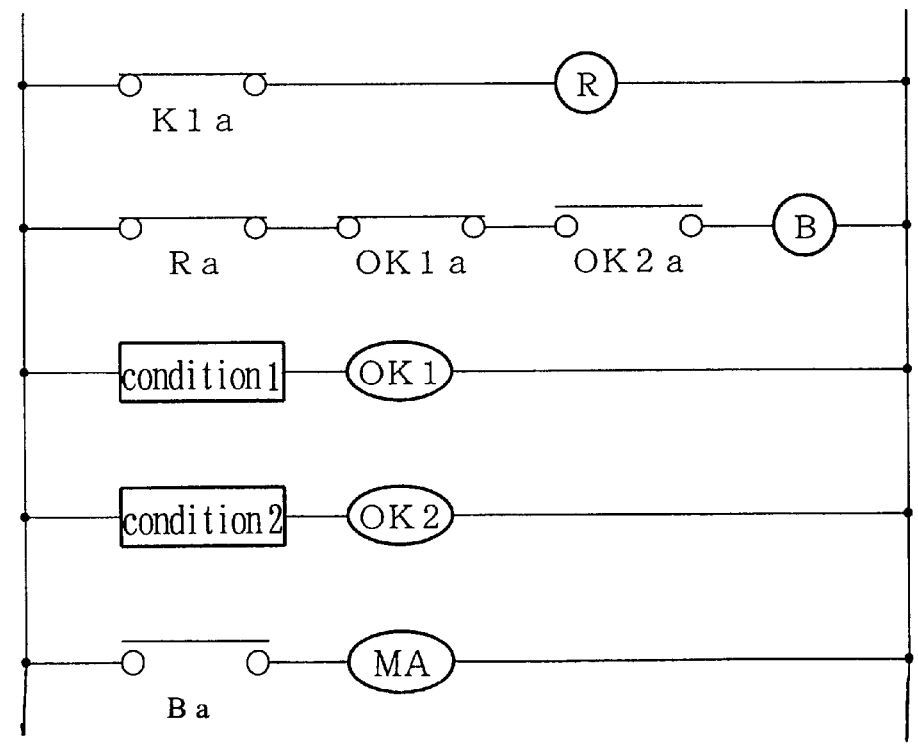
FIG. 8 is a circuit diagram showing a relay circuit at the robot mechanism portion.

Next, a description is given of the robot remote control system thus constructed, using a PHS as an example, with reference to FIG. 4 through FIG. 8. FIG. 4 is a flow chart showing actions in the robot remote control portion, FIG. 5 is a flow chart showing actions in the robot control portion, FIG. 6 is a flow chart showing actions in the robot sequencer control portion of the robot control portion, FIG. 7 is a circuit diagram showing a relay conversion circuit in the robot sequencer control portion, and FIG. 8 is a circuit diagram showing a relay circuit in the robot mechanism portion.

First, in FIG. 4, dialing is performed for connection of the PHS 19 as a mobile transmission device, and a signal of completion of dialing connection of the PHS is instructed to the CPU 11 via the data transmission card 18 and interface portion 17. Then, the CPU 11 judges that actions are possible, and displays in the display 13 that an action instruction is possible (S1). An operator which is informed, by the display 13, of an action instruction being enabled, turns on an action instruction key switch corresponding to the content of the action instruction, and the action instruction key switch, which was turned on, outputs an action instruction signal. The CPU 11 judges whether or not the action instruction signal is inputted (S2), wherein when it is judged that the action instruction signal is inputted, an action code table is retrieved by an action code retrieving means (not illustrated) (S3), and an action code corresponding to the above-mentioned action instruction signal is read out from the action code table (S4). (Table 1) shows an example of action codes corresponding to the action instruction key switch.

TABLE 1

| Name of action instruction key switch | Action codes |
| --- | --- |
| . | . |
| . | . |
| . | . |
| Forward | F8 |
| Backward | F9 |
| . | . |
| . | . |
| . | . |

(Table 1) indicates that an action instruction signal generated by turning on, for example, the action instruction key switch for instructing FORWARD will be converted to an action code of F8 (8 bits). The action codes read by the CPU 11 are outputted to the data transmission card 18 via the interface portion 17 (S5). In Step 2, when the CPU 11 judges that no action instruction signal is inputted, the CPU 11 outputs [0] code which means that no action instruction is provided, and the process shifts to Step 5 (S6).

Next, an operator turns on a control key switch corresponding to the content, and the control key switch which was turned on outputs a control signal. The CPU 11 judges whether or not the control signal is inputted (S7), wherein when it is judged that the control signal is inputted, the control code table is retrieved by a control code retrieving means (not illustrated) (S8), and the control code corresponding to the control signal is read from the control code table (S9). The control code read by the CPU 11 is outputted to the data transmission card 18 via the interface portion 17 (S10). An example of the control codes corresponding to the control key switches are shown in (Table 2).

TABLE 2

| Name of control key switch | Control code |
| --- | --- |
| Head portion | A1 |
| Leg portion | A2 |
| Hand portion | A3 |

(Table 2) expresses that a control signal (control signal to select an output signal from a color CCD camera installed at the head portion) generated by, for example, turning on the control instruction key switch for instructing the head portion is converted to a control code of A1 (8 bits).

Steps 1 through 10 are actions of the CPU 11, that is, the first computer 11A. The data transmission card 18 converts action codes from the second computer 11A to electric transmission data (the first wireless transmission data) and outputs to the mobile transmission device (PHS) 19, and the mobile transmission device 19 transmits the wireless transmission data through the antenna 7 as electric wave signals (the first wave signals).

The second mobile transmission device 20 receives electric wave signals from the antenna 7 via the PHS base station LS1, public communications network N, PHS base station LS2, and antenna 8, and outputs wireless transmission data to the second data transmission card 21. The second data transmission card 21 converts the wireless transmission data to action codes and control codes and outputs the codes to the CPU 23 through the interface portion 22. Actions in the CPU 23 are illustrated in FIG. 5.

In FIG. 5, first, the CPU 23 judges whether or not the action codes or control codes are received (S11), and when it is judged that the codes are received, the action codes or control codes are outputted to a robot sequencer control portion 30 through an interface portion 29.

FIG. 6 shows actions of the robot sequencer control portion.

In FIG. 6, the robot sequencer control portion 30 first judges whether or not the action codes are inputted (S21), and when it is judged that the codes are inputted, the action instruction retrieving means (not illustrated) of the robot sequencer control portion 30 retrieves the action instruction table (S22) and reads a relay pattern signal (action instruction signal) corresponding to the action code (S23). The relay pattern signals are bit pattern data as shown in FIG. 7. For example, where the relay pattern signal shows a relay K1, a relay conversion circuit actuates the relay K1. (Table 3) shows an example of an action instruction table.

TABLE 3

| Action code | Relay pattern signal |
| --- | --- |
| . | . |
| . | . |
| . | . |
| F8 | 11001001 |
| . | . |
| . | . |
| . | . |

(Table 3) shows that, in the case where an action code is F8, the relay pattern signal is [11001001] bit pattern data, and further shows that the pattern is an ON instruction signal which is turned on by turning on the relay K1. Thus, the robot sequencer control portion 30 outputs an ON signal of the relay K1 to the robot mechanism portion 4A as an ON signal of the relay contact K1a in FIG. 8. When a control code is inputted, the robot sequencer control portion 30 outputs it to the robot mechanism portion 4A as it is.

FIG. 8 is a relay circuit in the robot mechanism portion 4A, wherein if conditions 1 and 2 are established, as shown in FIG. 8, since the relay contact K1a is turned on, the relay B is then turned on. But, in FIG. 8, the condition 2 is not established although the condition 1 is established, and the relay OK2 is turned off while the relay OK1 is turned on. Herein, if the condition 2 is established and the relay OK2 is turned on, the relay B is turned on, and a motor relay MA is turned on via the ON contact Ba, whereby a motor (not illustrated) for forward and backward motions rotates clockwise, and the robot apparatus 2 in which the robot control portion 4 and robot mechanism portion 4A are incorporated is caused to advance. Also, a backward motion is also possible by reverse rotation of the motor.

The above forward and backward motions are a part of normal actions. However, the robot remote control portion 3 issues action codes such as emergency actions, for example an emergency stop, etc., maintenance actions, for example servo free, etc., in addition to the normal actions. Still further, there is an action of transmitting a status code showing the state of the robot mechanism portion 4A. The robot sequencer control portion 30 retrieves a status table (not illustrated) based on status signals (signals showing the states) from the robot mechanism portion 4A, and reads the status code. Transmission of the status code to the robot remote control portion 3 is similar to that described above, except for a difference in that only the direction is from the robot control portion 4 to the robot remote control portion 3.

Figure 3:
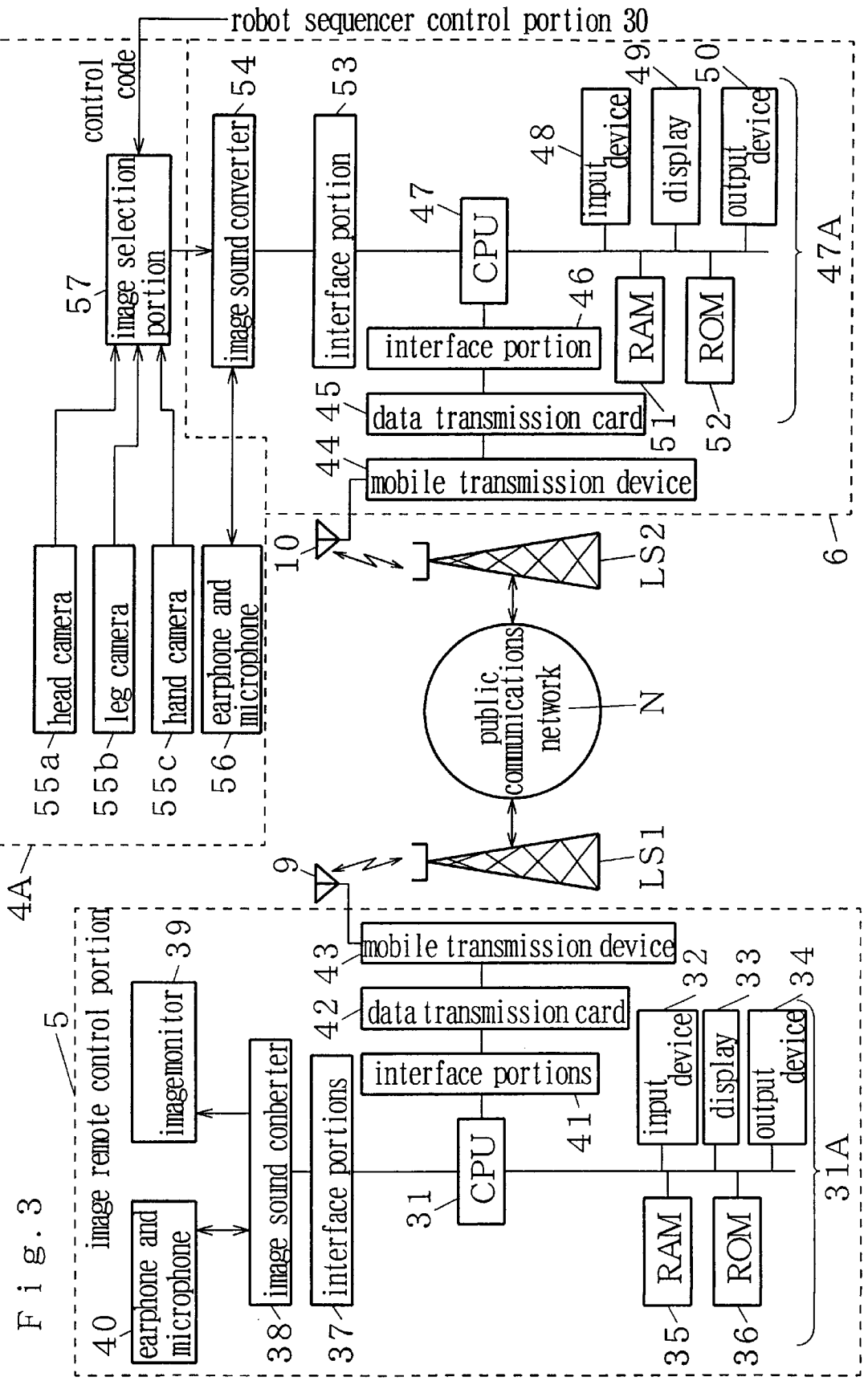
FIG. 3 is a block diagram showing an image remote processing system in FIG. 1.

Next, a description is given of actions of an image remote processing system, using FIG. 3.

FIG. 3 is a block diagram showing the image remote processing system in FIG. 1.

In FIG. 3, the robot mechanism portion 4A, image remote control portion 5, antennas 9 and 10, image processing unit 6, base stations LS1 and LS2, and public communications network N are similar to those in FIG. 1. Therefore, these are given the same reference numbers, and overlapping description thereof is omitted.

31A is the third computer, which includes interface portions 37 and 41 in charge of acceptance and transfer of data, a CPU 31 for processing data, an input device for inputting action instructions, etc., a display 33 for displaying data, an output device 34 for outputting data to a printer, etc., a RAM 35 for storing data, and a ROM 36 for storing programs and data. An image sound converter 38 converts digital sound signals and analog sound signals to each other, and converts digital image signals to analog image signals and outputs the same to an image monitor 39, an earphone and microphone 40 outputs input sound as analog sound signals and outputs the input analog sound signals as sound, The third data transmission card 42 converts digital sound signals outputted from the third computer 31A to the second wireless transmission data, and the third mobile transmission device 43 transmits the second wireless transmission data via the antenna 9 as the second electric wave signals. These components are incorporated in the image remote control portion 5.

The fourth mobile transmission device 44 outputs the second wireless transmission data upon receiving the second electric wave signals through the antenna 10. The fourth data transmission card 45 converts the second wireless transmission data to digital sound signals, and at the same time converts digital image signals outputted from the fourth computer 47A, described later, to the third wireless transmission data. The fourth computer 47A, into which digital sound signals are inputted from the fourth data transmission card 45, outputs digital image signals from a monochrome or color CCD camera 55, described later, via an image sound converter 54, described later, and digital sound signals from an earphone and microphone, described later, via an image sound converter 54, to the fourth data transmission card 45.

The fourth computer 47A includes interface portions 46 and 53 in charge of taking the roles of interfaces for acceptance and transfer of data, a CPU 47 for processing data, an input device 48 for inputting action instructions, etc., a display 49 for displaying data, an output device 50 for outputting data to a printer, etc., a RAM 51 for storing data, and a ROM for storing programs and data. An image sound converter 54 converts digital sound signals and analog sound signals to each other, converts digital image signals to analog image signals and outputs the data to an image monitor 39, and the image sound converter 54 is incorporated in the fourth computer 47A and image processing unit 6.

Monochrome or color CCD cameras 55a, 55b and 55c are, respectively, disposed at the head portion, leg portion and hand portion of the robot mechanism portion 4A and photographs an object and outputs the photographed data as analog color image signals. An earphone and microphone 56 is disposed at the head portion of the robot mechanism portion 4A, outputs input sounds as analog sound signals, and outputs input analog sound signals as sounds. An image selection portion 57 selects either one of the monochrome or color CCD camera (head portion camera) 55a at the head portion, the monochrome or color CCD camera (leg camera) 55b at the leg portion or the monochrome or color CCD camera (hand camera) 55c at the hand portion on the basis of control codes from the robot control portion 4.

Hereinafter, a description is given of the actions of the image remote processing system thus constructed.

An image transmission instruction signal inputted from the input device 32 of the third computer 31A of the image remote control portion 5 is further inputted from the CPU 31 into the third data transmission card 42 via the interface portion 41 as image transmission instruction data. The third data transmission card 42 converts the inputted image transmission instruction data to the second wireless transmission data and outputs the same to the third mobile transmission device 43, and the third mobile transmission device 43 transmits the wireless transmission data from the third data transmission card 42 via the antenna 9 as the second electric wave signals.

The fourth mobile transmission device 44 which received the second electric wave signals via the antenna 9, PHS base station LS1, public communications network N, PHS base station LS2 and antenna 10 converts the second electric wave signals to the second wireless transmission data and inputs the same into the fourth data transmission card 45. The fourth data transmission card 45 converts the second wireless transmission data to the image transmission instruction data. The CPU 47 into which the image transmission instruction data are inputted from the fourth data transmission card 45 via the interface portion 46 transmits color or monochrome image signals from a CCD camera selected by the image selection portion 57 of the robot mechanism portion 4A to the image remote control portion 5 via the antennas 10 and 9 in a reversed direction. The analog color or monochrome image signals from the CCD camera via the image selection portion 57 are converted to digital image signals by the image sound converter 54, and are inputted into the fourth data transmission card 45 via the fourth computer 47A, wherein the fourth data transmission card 45 converts digital image signals from the fourth computer 47A to the third wireless transmission data, and the fourth mobile transmission device 44 converts the third wireless transmission data from the fourth data transmission card 45 to the third electric wave signals and transmits the same through the antenna 10. The third mobile transmission device 43 of the image remote control portion 5 receives the third electric wave signals from the antenna 10 via the PHS base station LS2, public communications network N, PHS base station LS1, and antenna 9, and the third electric wave signals are inputted from the third mobile transmission device 43 into the third transmission card as the third wireless transmission data, and are further inputted therefrom into the third computer 31A as digital image signals.

The CPU 31 of the third computer 31A outputs the inputted digital image signals to the image sound converter 38 via the interface portion 37, and the image sound converter 38 converts the digital image signals to analog color image signals to output the same on an image monitor 39, thereby displaying the same as color images.

As regards sound signals, these are processed as the image signals. That is, analog sound signals from the earphone and microphone 40 are converted to digital sound signals by the image sound converter 38, and are outputted from the image sound converter 54 as analog sound signals through a signal channel and a transmission path as in the image signals. The analog sound signals are outputted from the earphone and microphone 56 as sounds. Further, the analog sound signals from the earphone and microphone 56 are converted to digital sound signals by the image sound converter 54, are outputted from the image sound converter 38 as analog sound signals through the same signal channel and transmission path as those for the image signals and are outputted from the earphone and microphone 40 as sounds.

Also, a PHS device is employed as an example of a mobile transmission device in the preferred embodiment. However, the invention is not limited to this PHS device but may be applied to a portable telephone set. Therefore, where a portable telephone set is available for transmission to foreign countries via an international telephone line, remote control of a robot apparatus is internationally enabled.

As described above, according to the invention, since action instruction signals from the robot remote control portion 3 are transmitted via a mobile transmission device 19 (for example, a PHS device) and action instructions can be provided anywhere (for example, anywhere in Japan) as far as electric wave signals of the mobile transmission device 14 can reach, it is possible to control the robot mechanism portion 4A by the robot remote control portion 3 even though a robot control portion 4 and a robot mechanism portion 4A, which are objects to be controlled, are placed anywhere. In addition, image signals from the image processing unit 6 can be automatically transmitted to the image remote control portion 5, and can be automatically displayed on an image monitor 39.

Further, since, in the CPU 11, action instruction and control inputted from an input device 12 are converted to action codes and control codes, the robot mechanism portion 4A can be automatically controlled by a robot control portion 4, and at the same time, it is possible to select images from cameras 55a, 55b and 55c of the robot mechanism portion 4A.

Still further, the CPU 11 retrieves an action code table, in which action codes are stored, for an action code corresponding to an action instruction where the action instruction is issued, and automatically generates the action code as the action instruction is inputted since the CPU 11 is provided with an action code retrieving means which is able to read out the retrieved action code, thereby automatically controlling the robot mechanism portion 4A. Also, processes similar to the above can be carried out for control codes. It is possible to automatically select either one of cameras 55a, 55b and 55c.

Further, the robot sequencer control portion 30 retrieves an action instruction table, in which action instructions corresponding to action codes are stored, when the action code is inputted, and it is possible to automatically control the robot mechanism portion 4A by the robot sequencer control portion 30 since it is provided with an action instruction retrieving means to read out a retrieved action instruction.

(Embodiment 2)

Figure 9:
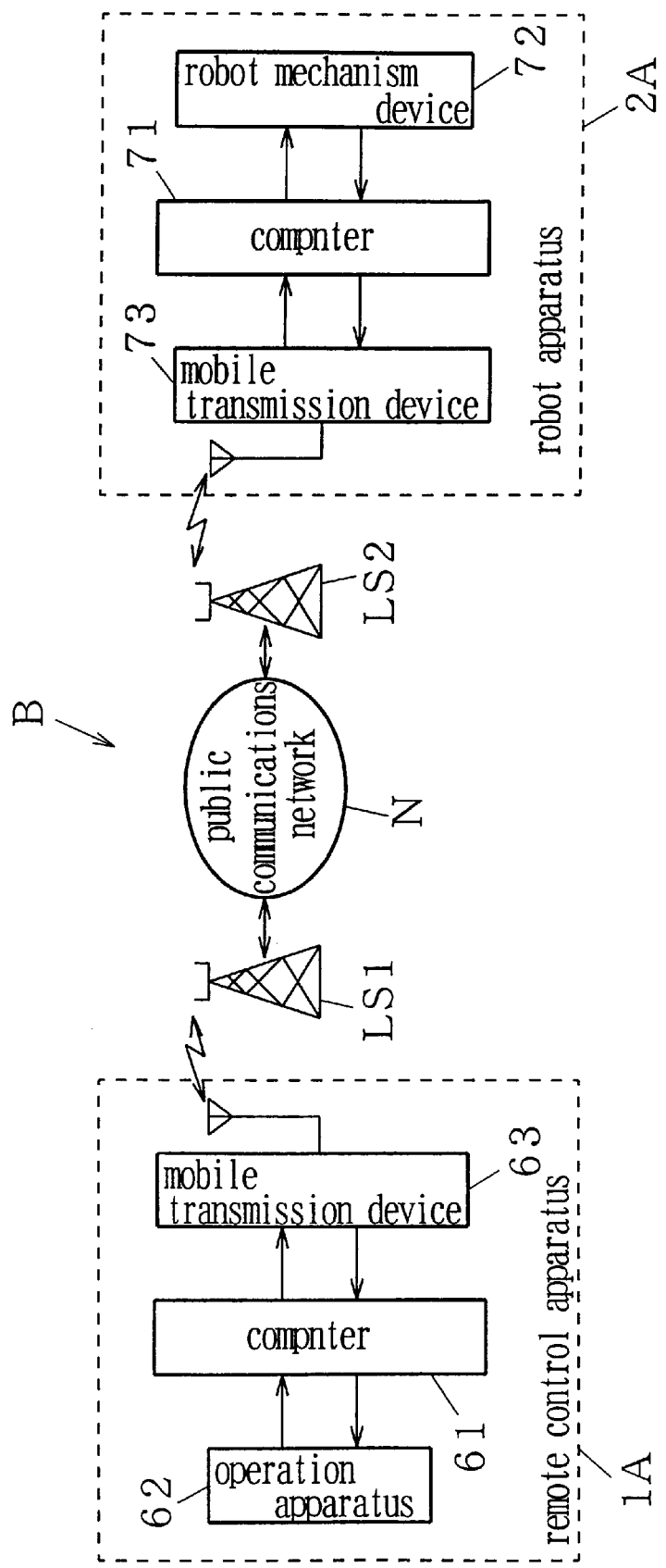
FIG. 9 is a configurational view showing a robot remote control system according to a second preferred embodiment of the invention.

FIG. 9 is a configurational view showing a robot remote control system according to the second preferred embodiment of the invention.

In FIG. 9, the PHS base stations LS1 and LS2, and public communications network N are similar to those in the first preferred embodiment. Therefore, these are given the same reference numbers as those in the first embodiment, and overlapping description thereof is omitted, B is a robot remote control system according to the second preferred embodiment, 1A is a remote control apparatus which constitutes the robot remote control system B, 2A is a robot apparatus which constitutes the robot remote control system B, 61 is a computer (the first computer) of the remote control apparatus 1A, 62 is an operation apparatus of the remote control apparatus 1A, 63 is a mobile transmission device (the first mobile transmission device) of the remote control apparatus 1A, 71 is a computer (the second computer) of the robot apparatus 2A, 72 is a robot mechanism of the robot apparatus 2A, and 73 is a mobile transmission device (the second mobile transmission device) of the robot apparatus 2A.

Hereinafter, a description is given of the actions of the robot remote control system B thus constructed.

The operation apparatus 62 is to operate motion portions (motion portions of the head portion, arm and finger portion described later) of the robot apparatus and outputs operation signals responsive to the amount of operation (for example, voltage value responsive to the angle of rotation, ON or OFF, etc.,). An operation signal from the operation apparatus 62 is inputted into the first computer 61, and the first computer 61 generates operation data (therefore, operation data responsive to the amount of operation) responsive to the abovementioned voltage value and outputs the same to the first mobile transmission device 63. The first mobile transmission device 63 in which the operation data are inputted transmits electric wave signals (electric wave signals such as operation data) including the operation data to the PHS base station LS1. The PHS base station LS1 transmits electric wave signals such as operation data, etc., to the PHS base station LS2 via a public communications network N. Therefore, the PHS base station LS2 transmits the electric wave signals such as operation data to the second mobile transmission device 73 of the robot apparatus 2A. The second mobile transmission device 73 picks up the operation data from the received electric wave signals such as operation data, etc., and outputs the same to the second computer 71. The second computer 71 receives the abovementioned operation data and converts the same to control data to control the robot mechanism portion 72 to output the same to the robot mechanism portion 72. The robot mechanism portion 72 receives the control data from the second computer 71 and controls the respective motion portions. The motion portions are the head portion, arm and finger portion, and travel portion. The finger portion is included in the arm and finger portion.

Figure 10:
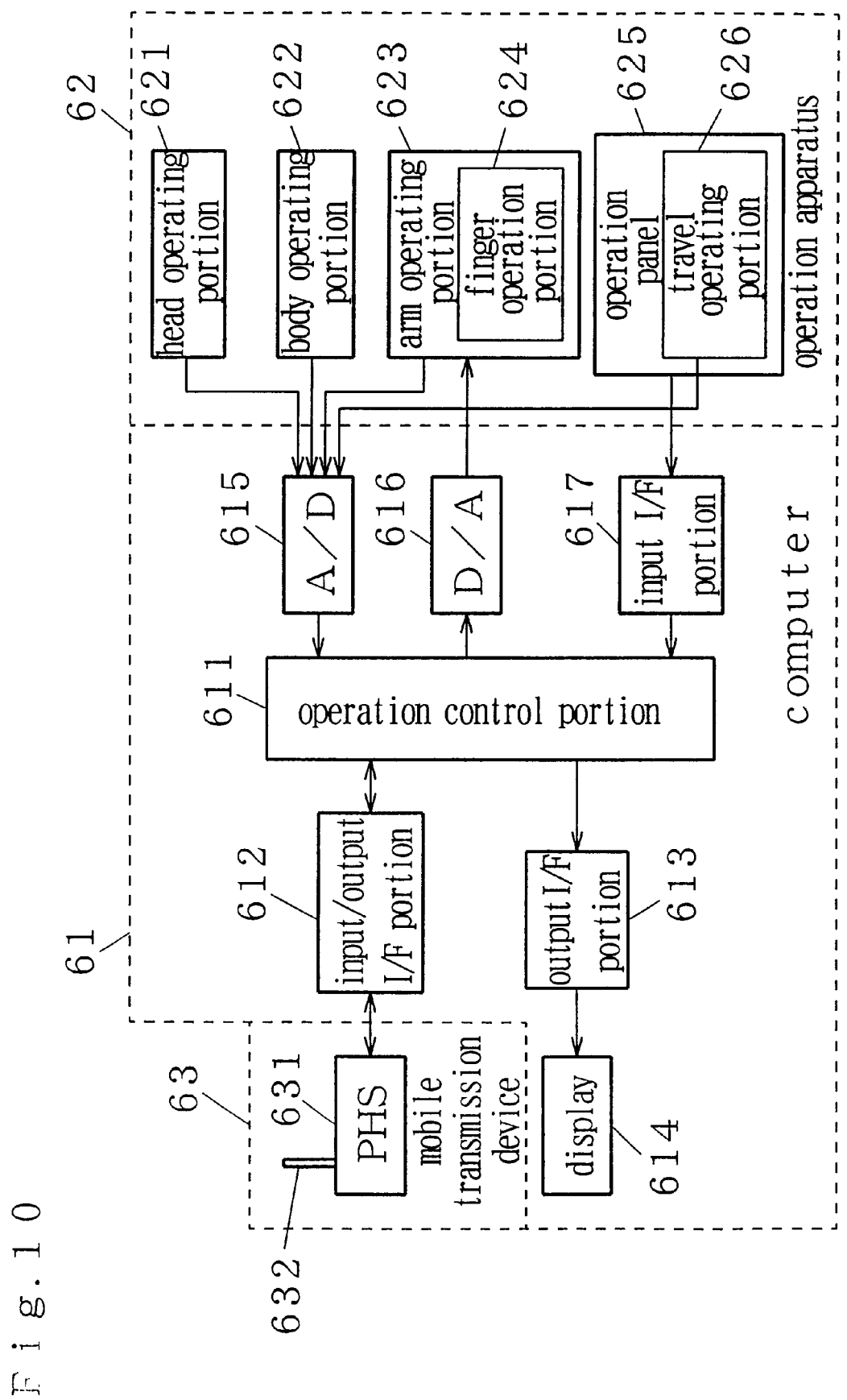
FIG. 10 is a block diagram showing details of the remote control apparatus in FIG. 9.

FIG. 10 is a block diagram showing the remote control apparatus 1A of FIG. 9 in details.

In FIG. 10, 61, 62 and 63 are a computer, an operation apparatus, and a mobile transmission device, respectively, as in FIG. 9, 611 is an operation control portion to control the entirety of the remote control apparatus 1A, 612 is an input/output I/F portion (input/output interface portion) in charge of acceptance and transfer of data with the mobile transmission device 63, 613 is an output I/F portion (output interface portion) to output display data to a display 614, 615 is an A/D converter, 616 is a D/A converter, 617 is an input I/F portion (input interface portion), 621 is a head portion operating portion for outputting operation signals of the head portion which acts as a motion portion of the robot mechanism portion 72, 622 is a body operating portion for outputting operation signals of the body portion which acts as a motion portion of the robot mechanism portion 72, 623 is an arm operating portion for outputting operation signals of the arm and finger portion which acts as a motion portion of the robot mechanism portion 72, 624 is a finger operating portion in the arm operating portion 623, 625 is an operation panel including a travel operating portion 626 which instructs a travelling wheel (objective drive wheel), forward or backward direction of travelling, and travelling speed, 631 is a PHS transmitting and receiving apparatus as the first mobile transmission device, and 632 is an antenna for transmitting and receiving in the form of PHS.

Figure 12:
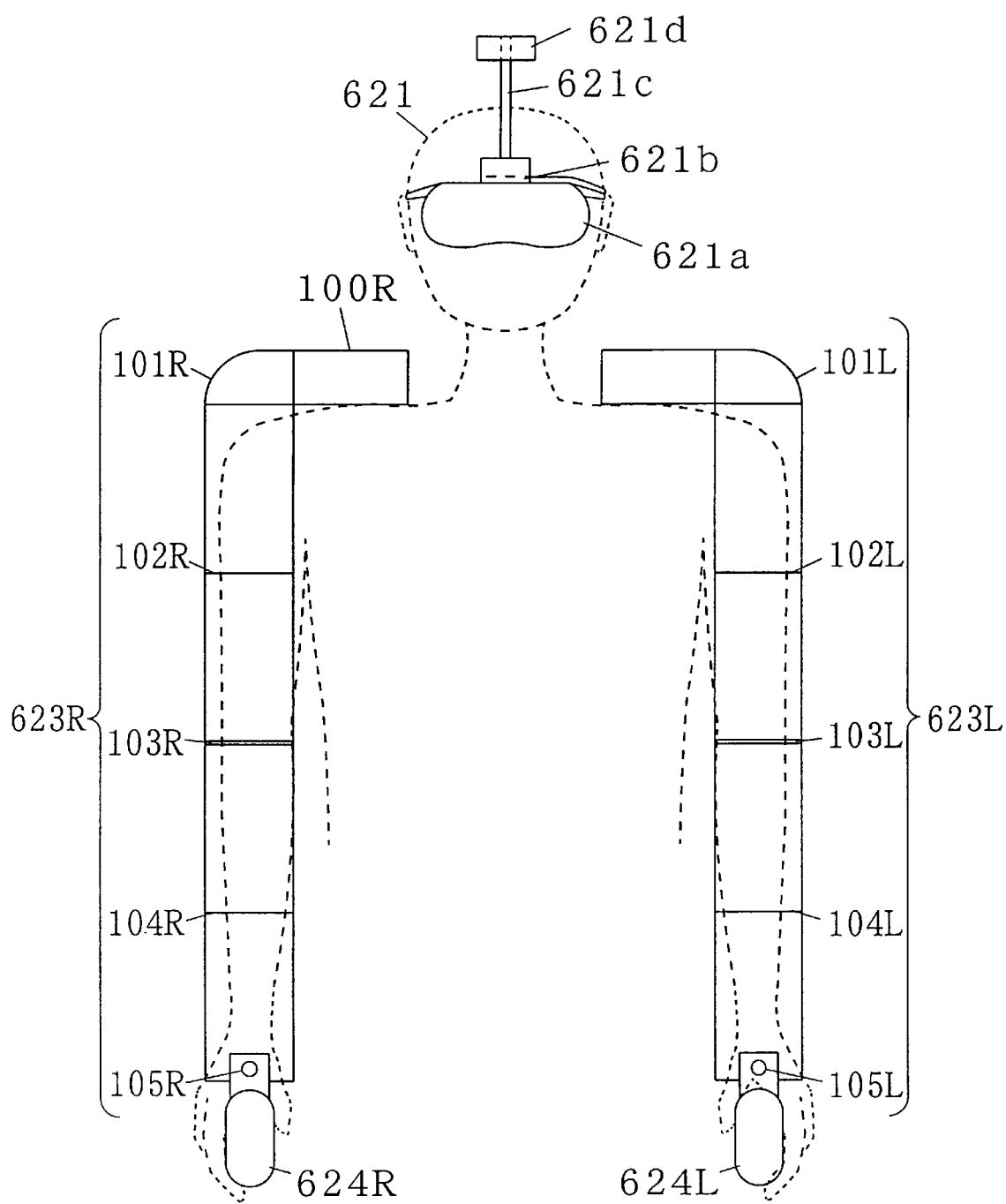
FIG. 12 is a configurational view showing the head portion operating portion and arm operating portion of FIG. 10.
Figure 13:
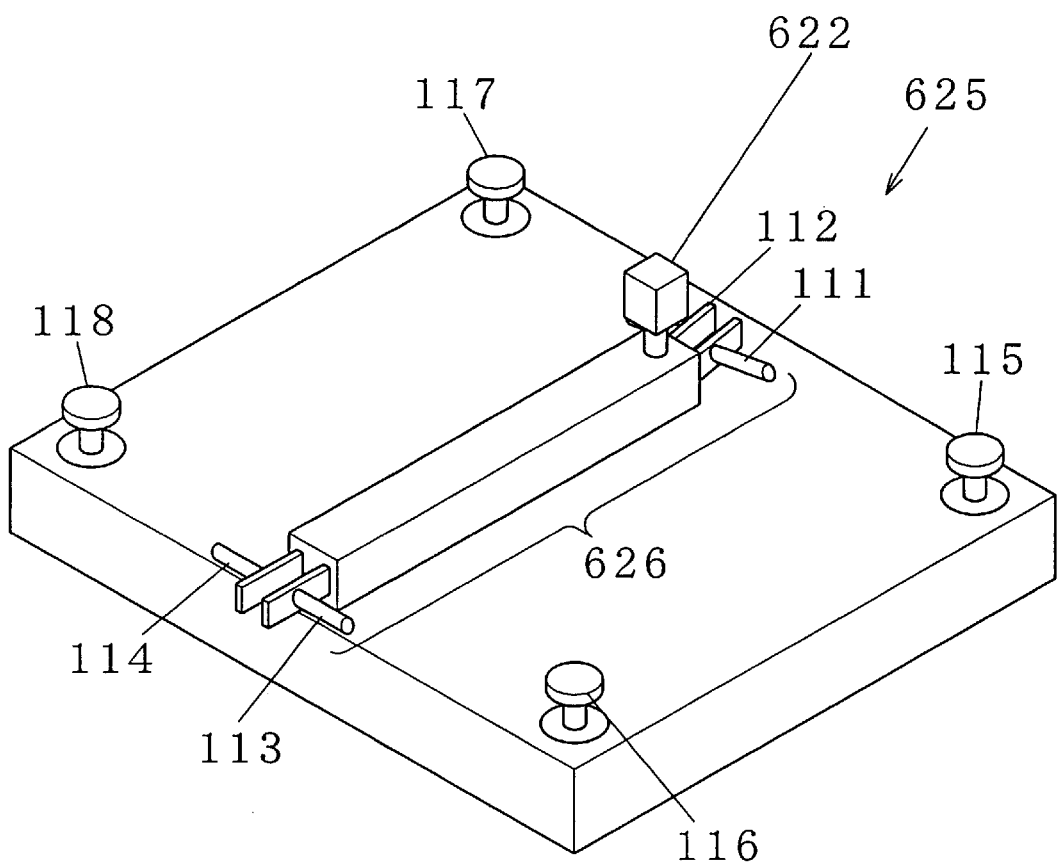
FIG. 13 is a perspective view showing the body operating portion and operation panel of FIG. 10.

Next, a description is given of the head portion operating portion 621, arm and finger operating portion 623 and travel operating portion 625, which are shown in FIG. 10, with reference to FIG. 12 and FIG. 13. FIG. 12 is a configurational view showing the head portion operating portion 621 and arm operating portion 623. FIG. 13 is a perspective view showing the body operating portion 622 and operation panel 625.

In FIG. 12, H is an operator, 621 is a head portion operating portion for operating forward or backward motions and left or right motions of the robot apparatus 2A mounted on the head portion of the operator H, 621$a$ is a head portion-mounted display for displaying an image, 621$b$ is an up and down angle detecting portion which turns along with the head portion-mounted display 621$a$ and detects the up and down turning of the head portion, 621$c$ is an axial rod integrated with the up and down angle detecting portion 621$b$, 621$d$ is a left and right angle detecting portion which detects a turning angle of the axial rod 621$c$ turning in line with left and right turning of the head portion, 623R and L, respectively, move in line with motions of the right arm and left arm of the operator H. The arm operation 623R is the right arm and finger portion of the operator H, and 623L is the left arm and finger portion thereof.

100R is an arm and finger attaching portion for fixing the right arm and finger portion 623R on a chair, etc., 101R is a shoulder operating portion for operating the forward or backward and left or right motions (forward or backward motions of the shoulder means forward or backward motions of the arm swing, and left or right motions of the shoulder means lift-up of the arm in the left or right direction) of the right shoulder of the robot apparatus 2A, 102R is an upper arm operating portion for operating the turning of the right arm, 103R is an elbow operating portion for operating the flexing of the right elbow, 104R is a front arm operating portion for operating the turning of the right front arm, 105R is a wrist operating portion for operating the turning of the right wrist, 624R is a finger operating portion for operating the right thumb, forefinger, and middle finger (the operation of the third finger and little finger is integrated with the middle finger), 100L is an arm and finger attaching portion for fixing the left arm and finger portion 623L on a chair, etc., 101L is a shoulder operating portion for operating the forward or backward and left or right motions (forward or backward motions of the shoulder means forward or backward motions of the arm swing, and left or right motions of the shoulder means lift-up of the arm in the left or right direction) of the left shoulder, 102L is an upper arm operating portion for operating the turning of the left arm, 103L is an elbow operating portion for operating the flexing of the left elbow, 104L is a front arm operating portion for operating the turning of the left front arm, 105L is a wrist operating portion for operating the turning of the left wrist, and 624L is a finger operating portion for operating the left thumb, forefinger, and middle finger (the operation of the third finger and little finger is integrated with the middle finger). Further, the left and right angle detecting portion 621$d$ is fixed on a chair via a supporting member (not illustrated) attached to the chair.

In FIG. 13, an operation panel 625 is placed at the foot portion of the operator H. 622 is a body operating portion for operating the up and down motion of the body, the travel operating portion 626 is similar to that in FIG. 10, 111 is an operation lever for operating the forward motions of the right drive wheel and travel speed thereof, 112 is an operation lever for operating the backward motions of the right drive wheel and travel speed thereof, 113 is an operation lever for operating the forward motions of the left drive wheel and travel speed thereof, and 114 is an operation lever for operating the backward motions of the left drive wheel and travel speed thereof. 115 through 118 are pushbutton switches. The pushbutton switches 115 through 118 are to output an instruction for invalidity of motion regulation, for example, an instruction for invalidity of travel prohibition (an instruction for making invalid a travel prohibition instruction which the robot apparatus generates due to an obstacle, etc., in the vicinity thereof).

A description is given of an example of the usage of the remote control apparatus 1A thus constructed.

(Table 4) shows operation signals inputted into the operation control portion 611 via the input interface portion 617 of the computer 61, that is, operation signals from the operation panel 625.

TABLE 4

| Name of signal |
| --- |
| Emergency stop |
| RUN |
| Light ON |
| Right wheel FORWARD ON |
| Right wheel BACKWARD ON |
| Left wheel FORWARD ON |
| Left wheel BACKWARD ON |
| Invalidity instruction 1 of motion regulation |

As shown in (Table 4), signals showing an emergency stop, left or right motions and forward or backward motions of the drive wheel are inputted into the operation control portion 611. An emergency stop signal is generated by turning on, for example, a pushbutton switch 115 of the operation panel 625, and is inputted into the operation control portion 611 via the input interface portion 617. And the signal is further transmitted to a robot apparatus 2A (Refer to FIG. 11) described later, via the input/output interface portion 612 and mobile transmission device 63. Also, a forward motion instruction of the right wheel is generated by an operator H lifting up the operation lever 111 of the operation panel 625, and a speed signal showing a speed responsive to the angle of lifting up of the operation lever 111 is generated. The forward motion signal among these is inputted into the operation control portion 611 via the input interface portion 617 as in the above, transmitted to the robot apparatus 2A of FIG. 11 via the input interface portion 612 and mobile transmission device 63, and drives a drive wheel 729R (See FIG. 14) of the travel portion 729 by a travelling motor 730 of the robot apparatus 2A described later. The above speed signal is inputted into the operation control portion 611 via the A/D conversion 615 as described later.

(Table 5) shows signals outputted from the operation control portion 611 to the display 614 via the output interface portion 613 of the computer 61.

TABLE 5

Name of signals

Robot status display 1 (Emergency stop)
Robot status display 2 (During running)
Robot status display 3
Robot status display 4
Robot status display 5
Robot status display 6
Robot status display 7
Robot status display 8

As shown in (Table 5), the display portion 614 shows respective statuses of the robot. Signals showing the respective statuses (Emergency stop, During running, etc.) of the robot are generated as sensor signals by a sensor portion 735 of the robot apparatus 2A described later, and these sensor signals are inputted into a robot control portion 711 via an input interface portion 716, transmitted to the remote control apparatus 1A via the mobile transmission device 73, and displayed on the display 614 via the mobile transmission device 63, input/output interface portion 612, operation control portion 611, and output interface portion 613.

(Table 6) shows operation signals analog-digitally converted by the A/D converter 615 and inputted into the operation control portion 611.

TABLE 6

| Range of motion | Name of signals |
| --- | --- |
| 180° | Head portion/Left and right/Axial position |
| 90° | Head portion/Up and down/Axial position |
| 90° | Body portion/Up and down |
| 225° | Right shoulder/Forward and backward |
| 225° | Left shoulder/Forward and backward |
| 180° | Right shoulder/Left and right |
| 180° | Left shoulder/Left and right |
| 180° | Right upper arm/Left and right (Turning) |
| 180° | Left upper arm/Left and right (Turning) |
| 135° | Right elbow/Forward and backward |
| 135° | Left elbow/Forward and backward |
| 180° | Right front arm/Left and right |
| 180° | Left front arm/Left and right |
| 90° | Right wrist/Left and right |
| 90° | Left wrist/Left and right |
| 90° | Right wrist/Up and down |
| 90° | Left wrist/Up and down |
|  | Right finger 1/ Open/Close |
|  | Left finger 1/ Open/Close |
|  | Right finger 2/ Open/Close |
|  | Left finger 2/ Open/Close |
|  | Right finger 3/ Open/Close |
|  | Left finger 3/ Open/Close |
|  | Right wheel / Speed |
|  | Left wheel / Speed |

As shown in (Table 6), operation signals of the head portion, operation signals of the arm and finger portion and speed instruction signals of the drive wheels are inputted into the operation control portion 611. These signals are generated by an operator moving his arm and fingers or operating the lever 111, etc., of the operation panel 625 as shown in FIG. 12. The range of motion in (Table 6) means that, in the case of 90°, the left and right, forward and backward or up and down range is 90°. In fact, it means a motion of ±45° at maximum in the left and right, forward and backward or up and down direction. The respective signals are generated at the respective operating portions 621 through 623 in FIG. 10, and the travel operating portion of the operation panel 625, inputted into the operation control portion 611 via the A/D converter 615, and inputted into the robot apparatus 2A via the input/output interface portion 612 and mobile transmission device 63. These signals drive the respective motors of the motor portion 722 of the robot apparatus 2A described later to actuate the head portion, arm and finger portion, etc. of the robot.

(Table 7) shows signals which are digital-analog converted by the D/A converter 616 and are outputted to the arm operating portion 623.

TABLE 7

| Name of signal | |
| --- | --- |
| Right finger 1 | Reaction force |
| Left finger 1 | Reaction force |
| Right finger 2 | Reaction force |
| Left finger 2 | Reaction force |
| Right finger 3 | Reaction force |
| Left finger 3 | Reaction force |

As shown in (Table 7), reaction force signals of three fingers 1, 2 and 3 are outputted to the finger operating portion 624, whereby loads respectively corresponding to the reaction force signals are provided to the respective fingers. Further, the reaction force signals are generated by the finger reaction forcedetectingportion734 (See FIG. 11) of the robot apparatus 2A described later, inputted into the operation control portion 611 via the mobile transmission devices 73 and 63, digital-analog converted by the D/A converter 616, inputted into the arm operating portion 623, and causes the finger portion of the finger operating portion 624 to generate reaction forces. Therefore, when the fingers of the robot apparatus 2A operates an object difficult to move, a heavy load is provided to the fingers of the finger operating portion 624, whereby it is possible to sense the finger motions at the robot apparatus 2A at the remote control apparatus 1A side.

Figure 15:
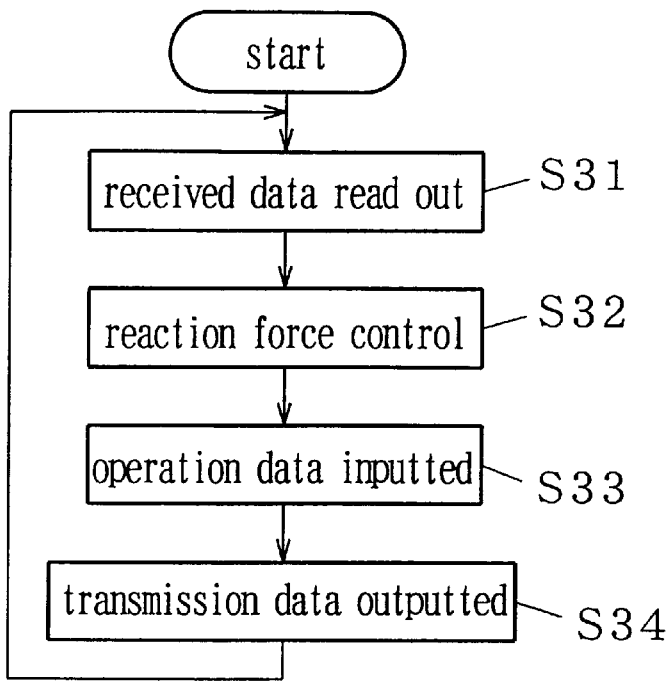
FIG. 15 is a flow chart showing motions of the remote control apparatus of FIG. 10.

Next, a description is given of actions of the remote control apparatus of FIG. 10 with reference to FIG. 15.

FIG. 15 is a flow chart showing the motions of the remote control apparatus of FIG. 10.

First, the PHS device 631 receives transmission signals from the robot apparatus 2A through the PHS base station LS1 (See FIG. 9). The received data are robot status data shown in (Table 5) and finger reaction forces shown in (Table 7). These data are inputted into the operation control portion 611 via the input/output interface portion 612 (S31). Next, the operation control portion 611 outputs finger reaction forces to the arm operating portion 623 via the D/A converter 616, and the arm operating portion 623 carries out a reaction control (S32) on the basis of the abovementioned finger reaction data. The operation principle of the finger reaction control will be described in detail later. Further, the operation control portion 611 outputs the robot status data in (Table 5) to the display 614 via the output interface portion 613, and displays the same at the display 614.

Next, operation signals (See (Table 6)) from the head portion operating portion 621, body operating portion 622, arm operating portion 623 and travel operating portion 626 are converted to digital data (operation data) by the A/D converter 615 and inputted into the operation control portion 611. Further, ON and OFF signals (See (Table 4)) indicating an object drive wheel, forward or backward motion, which are from the operation panel 625, are inputted into the operation control portion 611 via the input interface portion 617 as operation data as in the above (S33). The operation control portion 611 outputs the respective operation data to the respective PHS devices 631 via the input/output interface portion 612, and the PHS devices 631 modulate the above operation data and transmit the same to the PHS base station LS1 (See FIG. 9) as electric wave signals. As described above, the robot apparatus 2A receives electric wave signals from the PHS base station 631 via the PHS base station LS1, public communications network N, and PHS base station LS2, whereby the electric wave signals control the respective motions of the robot apparatus 2A. Further, operation signals from the travel operating portion 626, which are inputted into the A/D converter 615, are selection signals and speed signals of the object drive wheel as described above.

Figure 11:
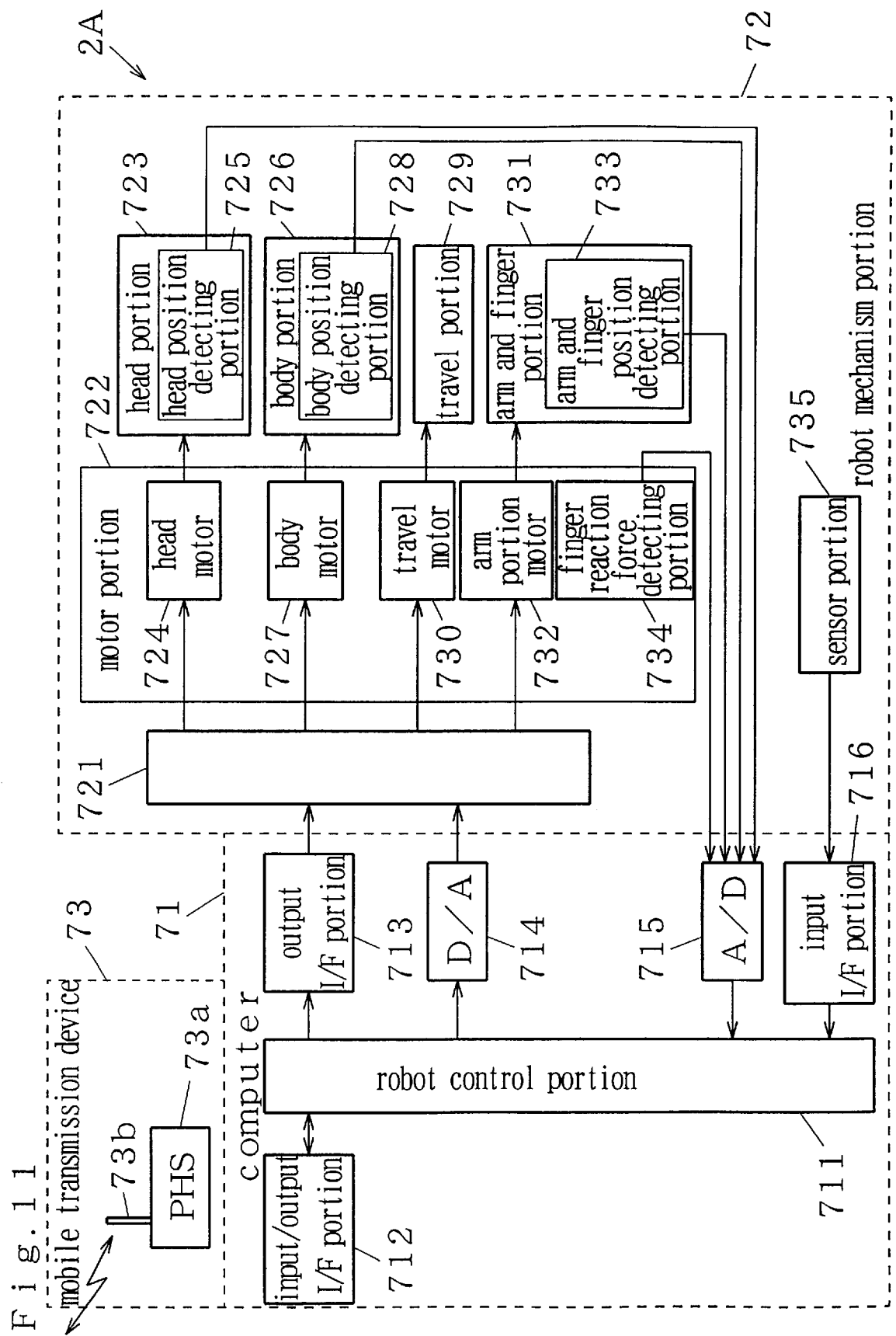
FIG. 11 is a block diagram showing details of the robot apparatus in FIG. 9.

FIG. 11 is a block diagram showing the robot apparatus 2A of FIG. 9 in detail.

In FIG. 11, 71, 72 and 73, respectively, are a computer, a robot mechanism portion and a mobile transmission device as in FIG. 9. 711 is a robot control portion for controlling the entirety of the robot apparatus 2A. 712 is an input/output I/F portion (input/output interface portion) in charge of acceptance and transfer of data in connection with the mobile transmission device 73. 713 is an output I/F portion (output interface portion) which outputs data to the robot mechanism portion 72. 714 is a D/A converter which converts digital data to analog data and outputs the same to the robot mechanism portion 72. 715 is an A/D converter which converts analog data from the robot mechanism portion 72 to digital data. 716 is an input I/F portion (input interface portion) for inputting data from the robot mechanism portion 72. 721 is a driver portion which inputs data from the output interface portion 713 and the D/A converter 714 and generates a motor drive voltage. 722 is a motor portion, 723 is the head portion of the robot apparatus 2A, which is driven by the head portion motor 724. 725 is a head position detecting portion. 726 is the body portion of the robot apparatus 2A, which is driven by a body motor 727. 728 is a body position detecting portion. 729 is a travel portion of the robot apparatus 2A, which is driven by a travel motor 730. 731 is an arm and finger portion driven by an arm portion motor 732 which drives arms and fingers. 733 is an arm and finger position detecting portion, 734 is a finger reaction force detecting portion which detects the reaction forces of a thumb, a forefinger, and a middle finger (including the third finger and small finger). 735 is a sensor portion which detects an obstacle, etc., in the vicinity of the robot apparatus 2A. 73a is a PHS device as a mobile transmission device, and 73b is an antenna which is in charge of transmitting and receiving by a PHS.

Figure 14:
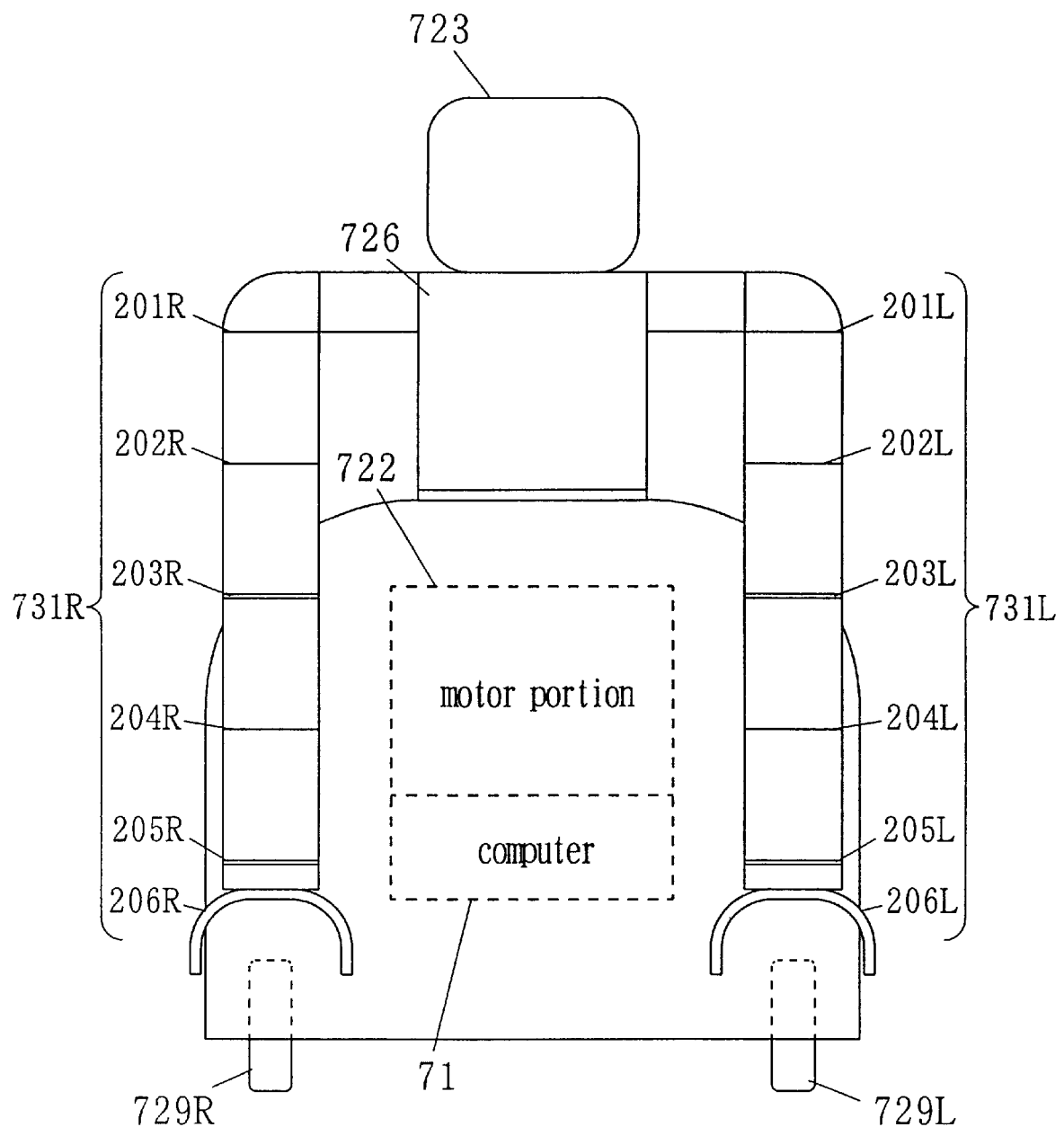
FIG. 14 is a configurational view showing a robot apparatus.

Also, FIG. 14 is a configurational view showing the robot apparatus 2A.

In FIG. 14, a computer 71, a motor portion 722 accommodating motors for the head portion, body portion, travel and arm and finger portion, etc., head portion 723 and body portion 726 are similar to those in FIG. 11. 729L is the left drive wheel which constitutes the travel portion 729, 729R is a right drive wheel which constitutes the travel portion 729, 731L is the left arm and finger portion, 731R is the right arm and finger portion, 201L is the left shoulder portion, 202L is the left upper arm portion, 203L is the left elbow portion, 204L is the left front arm portion, 205L if the left wrist portion, 206L is the left finger portion, 201R is the right shoulder portion, 202R is the right upper arm portion, 203R is the right elbow portion, 204R is the right front arm portion, 205R is the right wrist portion, and 206R is the right finger portion. Further, connection with the PHS device 73a is executed at an adequate position of the computer 71.

In FIG. 14, wires are laid between the motor portion 722 and the head portion 723, body portion 726, travel portion 729, or arm and finger portion 731, and these wires transmit drive forces of the respective motors of the motor portion 722 to provide forward or backward motions, left or right turning or up and down motions to the respective portions.

A description is given of usage data of the robot apparatus 2A thus constructed. (Table 8) shows sensor signals inputted into the robot control portion 711 via the input interface portion 716 of the computer 71.

TABLE 8

| Name of signal |
| --- |
| Sensor input 1 |
| Sensor input 2 |
| Sensor input 3 |
| Sensor input 4 |
| Sensor input 5 |
| Sensor input 6 |

These are signals showing obstacles in the vicinity of the robot apparatus 2A as described with reference to (Table 5). Adjacent obstacles are detected by light, infrared ray, and ultrasonic sensors.

(Table 9) shows signals corresponding to (Table 4) and (Table 6), which are an emergency stop, left or right motions or forward or backward motions of drive wheels, and clockwise or counterclockwise rotation of the head portion motor 724, body motor 727, travel motor 730 and arm motor 732.

TABLE 9

| Name of signal |
| --- |
| Emergency stop instruction |
| RUN instruction |
| Light ON |
| Head portion left and right motor CW |
| Head portion left and right motor CCW |
| Head portion up and down motor CW |
| Head portion up and down motor CCW |
| Body up and down motor CW |
| Body up and down motor CCW |
| Right shoulder forward and backward motor CW |
| Right shoulder forward and backward motor CCW |
| Left shoulder forward and backward motor CW |
| Left shoulder forward and backward motor CCW |
| Right shoulder left and right motor CW |
| Right shoulder left and right motor CCW |
| Left shoulder left and right motor CW |
| Left shoulder left and right motor CCW |
| Right upper arm left and right motor CW |
| Right upper arm left and right motor CCW |
| Left upper arm left and right motor CW |
| Left upper arm left and right motor CCW |
| Right elbow forward and backward motor CW |
| Right elbow forward and backward motor CCW |
| Left elbow forward and backward motor CW |
| Left elbow forward and backward motor CCW |
| Right front arm left and right motor CW |
| Right front arm left and right motor CCW |
| Left front arm left and right motor CW |
| Left front arm left and right motor CCW |
| Right wrist left and right motor CW |
| Right wrist left and right motor CCW |
| Left wrist left and right motor CW |
| Left wrist left and right motor CCW |
| Right wrist up and down motor CW |
| Right wrist up and down motor CCW |
| Left wrist up and down motor CW |
| Left wrist up and down motor CCW |
| Right finger 1 open and close motor CW |
| Right finger 1 open and close motor CCW |
| Left finger 1 open and close motor CW |
| Left finger 1 open and close motor CCW |
| Right finger 2 open and close motor CW |

TABLE 9-continued

Name of signal

Right finger 2 open and close motor CCW
Left finger 2 open and close motor CW
Left finger 2 open and close motor CCW
Right finger 3 open and close motor CW
Right finger 3 open and close motor CCW
Left finger 3 open and close motor CW
Left finger 3 open and close motor CCW
Right wheel motor CW
Right wheel motor CCW
Left wheel motor CW
Left wheel motor CCW These signals are outputted from the robot control portion 711 into the driver portion 721 via the output interface portion 713.

(Table 10) shows signals inputted from the respective detection portions of the robot mechanism portion 72 via the A/D converter 715.

TABLE 10

| Range of motion | Name of signals |
| --- | --- |
| 180° | Head portion/Left and right/Axial position |
| 90° | Head portion/Up and down/Axial position |
| 90° | Body portion/Up and down |
| 225° | Right shoulder/Forward and backward |
| 225° | Left shoulder/Forward and backward |
| 180° | Right shoulder/Left and right |
| 180° | Left shoulder/Left and right |
| 180° | Right upper arm/Left and right |
| 180° | Left upper arm/Left and right |
| 135° | Right elbow/Forward and backward |
| 135° | Left elbow/Forward and backward |
| 180° | Right front arm/Left and right |
| 180° | Left front arm/Left and right |
| 90° | Right wrist/Left and right |
| 90° | Left wrist/Left and right |
| 90° | Right wrist/Up and down |
| 90° | Left wrist/Up and down |
| | Right finger 1/ Open/Close |
| | Left finger 1/ Open/Close |
| | Right finger 2/ Open/Close |
| | Left finger 2/ Open/Close |
| | Right finger 3/ Open/Close |
| | Left finger 3/ Open/Close |
| | Right finger 1 reaction force |
| | Left finger 1 reaction force |
| | Right finger 2 reaction force |
| | Left finger 2 reaction force |
| | Right finger 3 reaction force |
| | Left finger 3 reaction force |

The range of motion means that, in a case of 90 degrees, the left and right, forward and backward or up and down range is 90 degrees. In general, it means that motions can be carried out in ±45 degrees in the left and right, forward and backward or up and down direction.

(Table 11) shows signals digital-analog converted by the D/A converter 714 and outputted to the driver portion 721.

TABLE 11

Name of signal

Right finger 1 open and close motor speed
Left finger 1 open and close motor speed
Right finger 2 open and close motor speed
Left finger 2 open and close motor speed
Right finger 3 open and close motor speed TABLE 11-continued Name of signal Left finger 3 open and close motor speed
Right wheel motor speed
Left wheel motor speed These signals are speed instruction signals showing the speeds, wherein the speed signals of the drive wheel motor are generated by the respective levers 111 through 114 of the operation panel 625 of the remote control apparatus 1A as described above, and the finger speeds are generated by the robot control portion 711.

Figure 16:
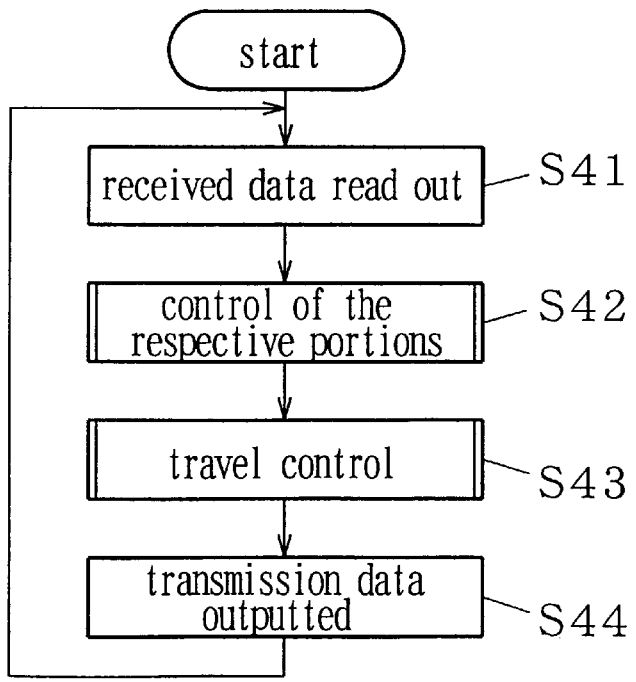
FIG. 16 is a flow chart showing motions of the robot apparatus.
Figure 17:
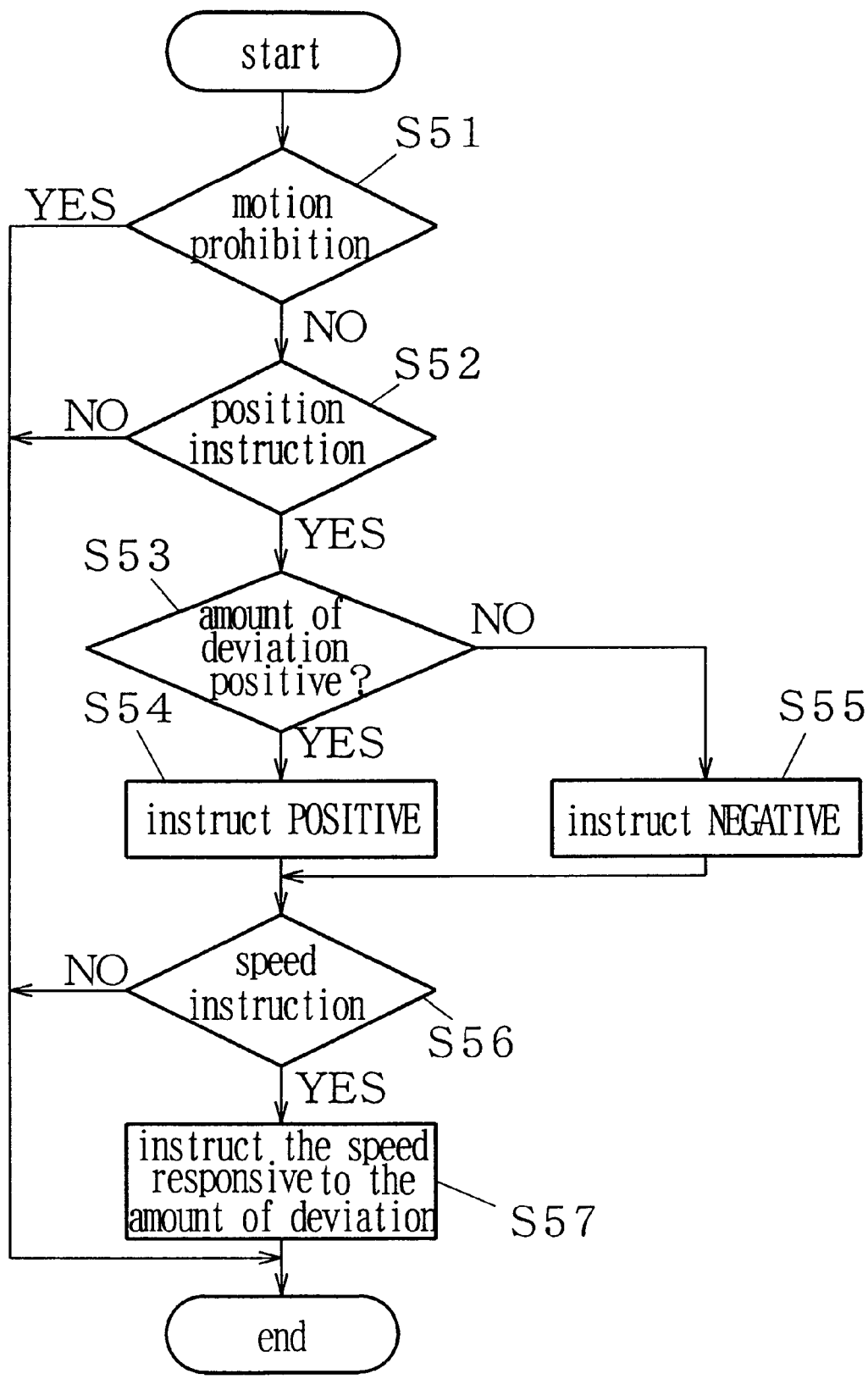
FIG. 17 is a flow chart showing control processes at the respective portions of FIG. 16.
Figure 18:
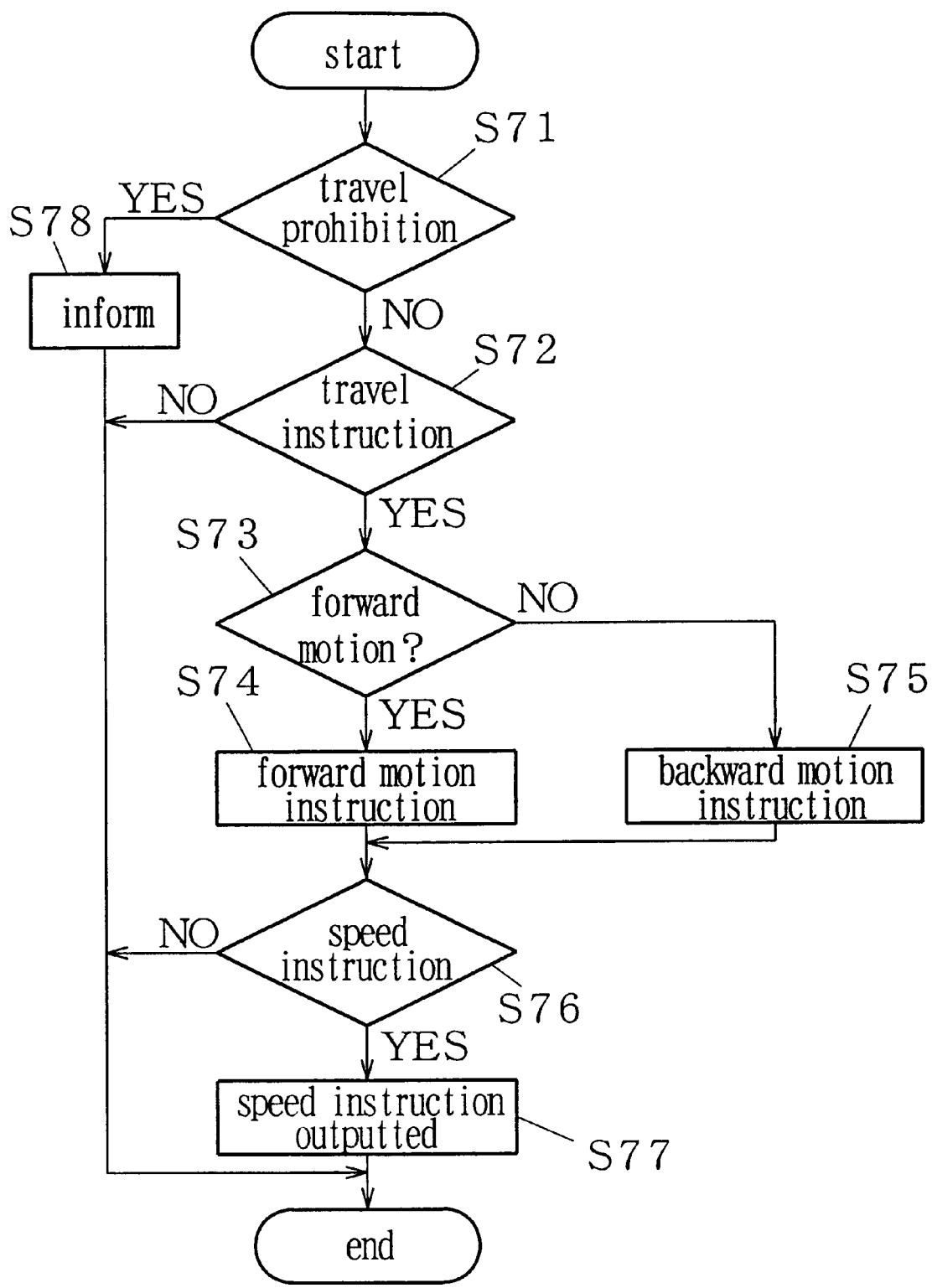
FIG. 18 is flow chart showing a travel controlling process of FIG. 16.

A description is given of the motions of the robot apparatus 2A thus constructed, with reference to FIG. 16 through FIG. 18. FIG. 16 is a flow chart showing motions of the robot apparatus 2A, FIG. 17 is a flow chart showing control processes of the respective portions, and FIG. 18 is a .flow chart showing the travel control process in FIG. 16.

First, in FIG. 16, the PHS device 73a receives transmission signals from the remote control apparatus 1A via the PHS base station LS2 (See FIG. 9). The received data are the respective operation data which will be the base of the respective signals shown in (Table 9), and speed instruction signals shown in (Table 11). These received data are inputted into the robot control portion 711 via the input/output interface portion 712 (S41), and outputted to the driver portion 721 via the output interface portion 713 and D/A converter 714 as control data (S42 and S43). The driver portion 721 into which the control data are inputted provides a motor drive voltage to the head portion motor 724, body motor 727, travel motor 730, and arm motor 732, and the respective motors drive the head portion 723, body portion 726, travel portion 729, and arm and finger portion 731. Also, in this case, position control is given to the head portion 723, body portion 726, and arm and finger portion 731 (excluding the finger portions), position control and speed control are provided to the finger portions, and selection control and speed control are provided to the travel portion 729 in connection to the object drive wheel. These controls will be described in detail later, wherein the control of the head portion 723, body portion 726 and arm and finger portion 731 is described, using the control processes of the respective portions in FIG. 1, and a travel control process is described, using FIG. 18, in connection to the travel portion 729.

Next, the robot control portion 711 inputs the head position data, body position data, arm and finger position data, and finger reaction force data, respectively, sent from the head position detecting portion 725, body position detecting portion 728, arm and finger position detecting portion 733, and finger reaction force detecting portion 734 via the A/D converter 715, and the robot control portion 711 inputs data (for example, data showing obstacle detection in the vicinity thereof) from the sensor portion 735 via the input interface portion 716 as robot status data. The respective position data among these data may be used as feedback data of the respective portions. Also, the finger reaction data and robot status data are transmitted to the remote control device 1A via the input/output interface portion 712 and PHS device 73a (S44).

Next, a description is given of control processes (S42) of the respective portions in FIG. 16 with reference to FIG. 17.

First, the robot control portion 711 judges whether or not motion prohibition is available (S51). If a motion is prohibited, this control process is not executed. For example, an arm left and right motion may be listed as motion prohibition in order to prevent a danger. If this arm left and right motion is prohibited, no arm left and right motion can be performed. However, as shown in (Table 4), an invalid instruction for regulating motions is made valid for the left and right motions of the arm, whereby the left and right motions can be executed even though the left and right motion of the arm is prohibited. Therefore, motion prohibition in Step S51 is judged for each of the motions. If there is no motion prohibition, it is judged whether or not a position instruction is available (S52). Cases where a position instruction is provided are cases where operation data of a position instruction differing from the actual position (that is, the detected position) is transmitted from the remote control apparatus 1A or where the instructed position is different from the detected position due to any fluctuation. Where no position instruction is provided, the control process is terminated.

In a case where there is a position instruction in Step S52, it is judged whether the amount of deviation is positive or negative (S53). If the amount of deviation is positive, the robot control portion 711 instructs POSITIVE (Motor CW) to the driver portion 721 as shown in (Table 9) (S54). Where the amount of deviation is negative, NEGATIVE (Motor CCW) is instructed (S55). Next, it is judged whether or not any speed instruction is provided (S56). For example, it is judged that a speed instruction is provided where the speed of a finger position change changes in line with the finger reaction force data. If there is a speed instruction, the robot control portion 711 instructs the speed responsive to the amount of deviation (S57).

Next, a description is given of a travel control process (S43) in FIG. 16, with reference to FIG. 18.

First, it is judged (S71) whether or not travel prohibition is provided. For example, travel prohibition is travel prohibition due to detection of an obstacle. No travel is executed if the travel prohibition is provided. However, in a case where such an invalid instruction as shown in (Table 4) is effective for travel, the travel is executed even in a travel prohibited state. If travel is prohibited, an operator is informed of the travel prohibition, and the travel control process is terminated (S78). If no travel prohibition is provided, it is judged whether or not a travel instruction is provided (S72). If no travel instruction is provided, the travel control process is terminated. If a travel instruction is provided, it is judged whether or not a forward motion is carried out (S73). If a forward motion is judged, a forward motion instruction is provided to the driver portion 721 via the output interface portion 713 (S74), and if a backward motion is judged, a backward motion is instructed (S75). Next, the robot control portion 711 judges whether or not a speed instruction is provided (S76), and if no speed instruction is provided, the travel control process is terminated. And, if such a speed instruction as shown in (Table 11) is provided, the instructed speed is outputted via the D/A converter 714.

Figure 19:
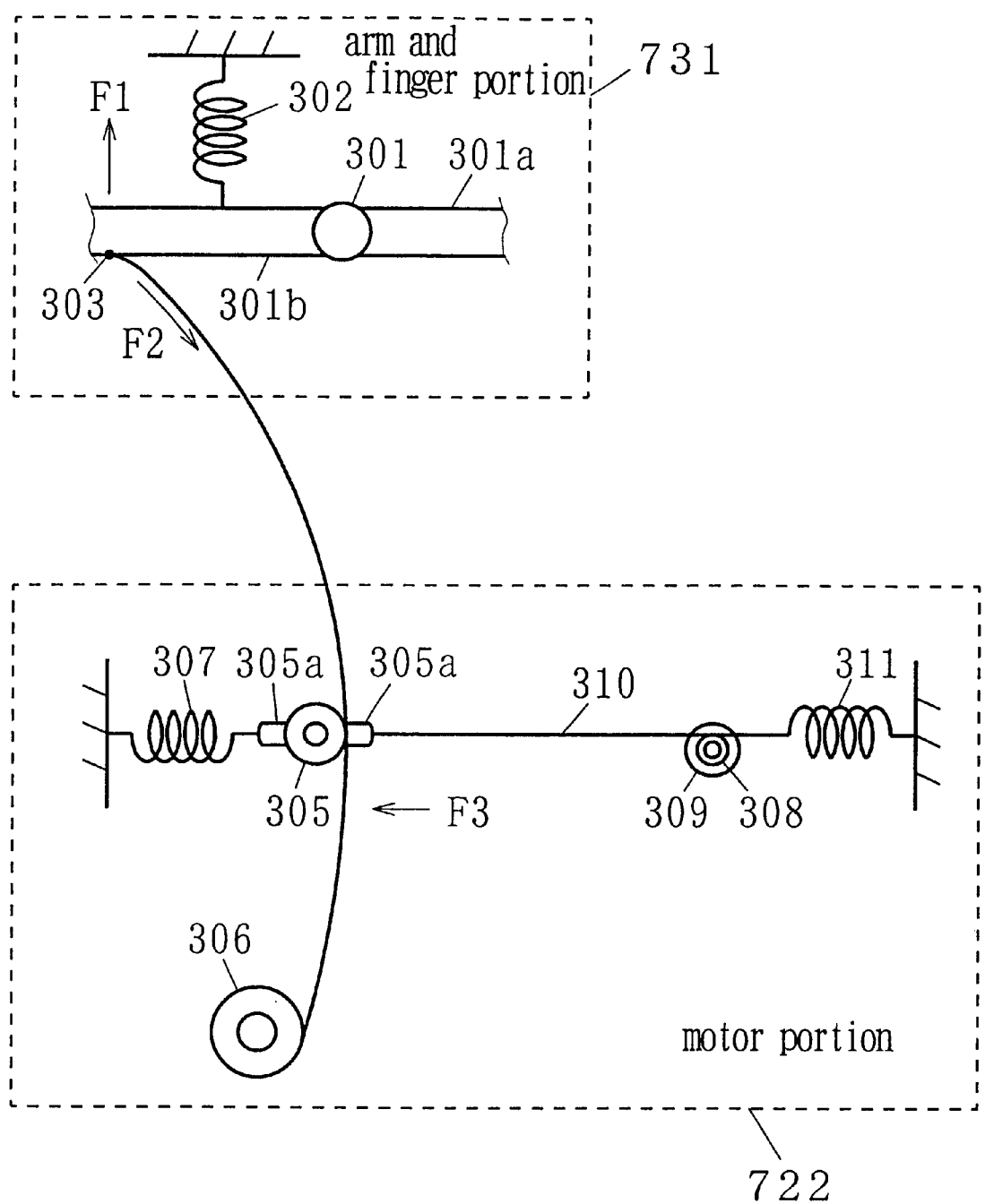
FIG. 19 is a view explaining a detection principle of a finger reaction force.
Figure 20:
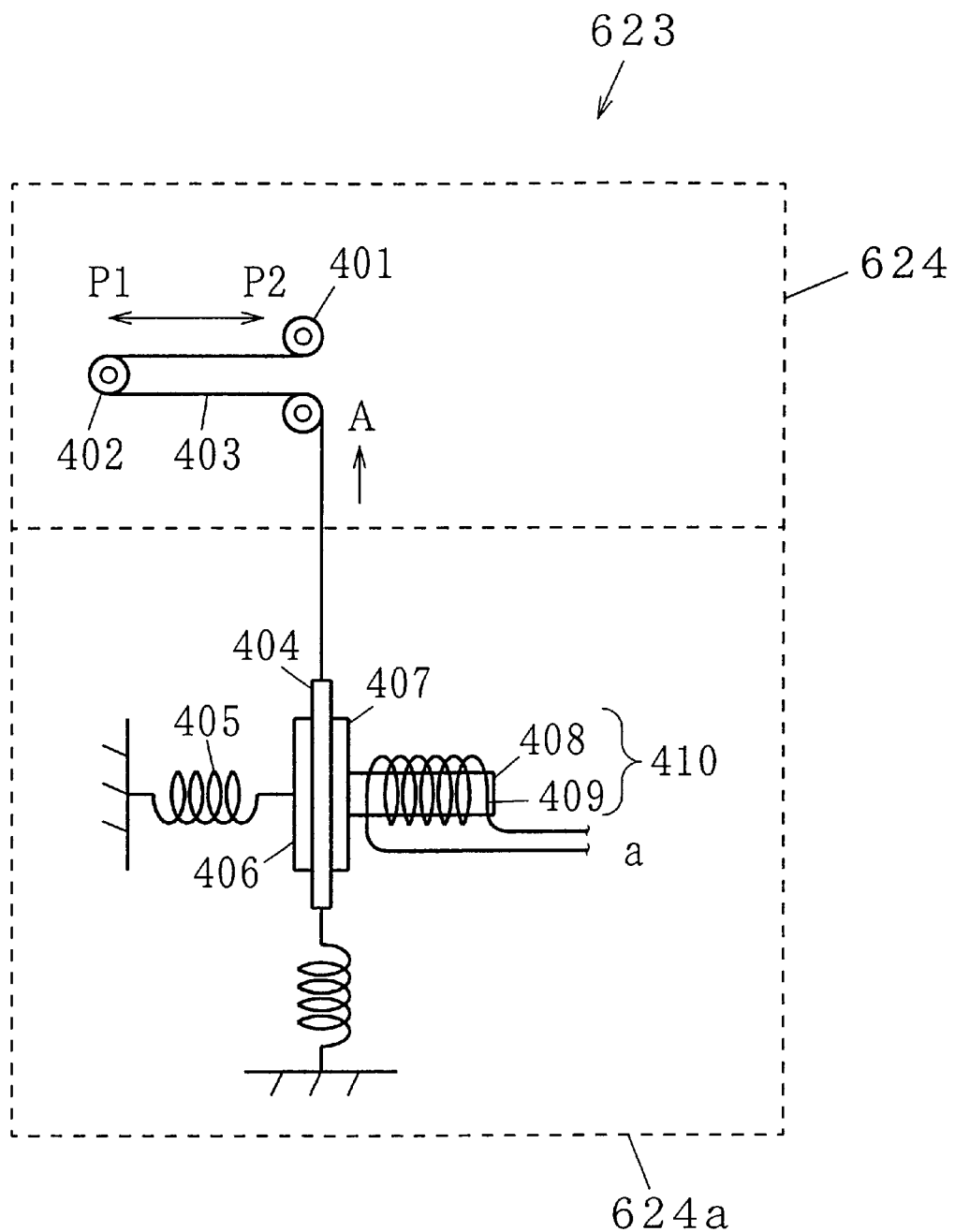
FIG. 20 is a view explaining finger load motions on the basis of the finger reaction data.

Next, with reference to FIG. 19 and FIG. 20, a description is given of the detection principle of a finger reaction force and finger load actions on the basis of the finger reaction force data of the finger portion of the arm and finger portion 731.

FIG. 19 is a view explaining the detection principle of a finger reaction force, and FIG. 20 is a view explaining a finger loaded motion based on the finger reaction data.

In FIG. 19, 722 is a motor portion as in FIG. 11, 731 is an arm and finger portion (accurately, the finger portion of the arm and finger portion 731) of the robot mechanism portion 72 as in FIG. 11, 301 is a rotating portion, 301a is a fixing portion for pivotally supporting the rotating portion 301, 301b is a movable portion having one end thereof fixed at the rotating portion 301 and rotating in line with rotations of the rotating portion 301. 302 is a resilient member such as a spring, rubber, etc., which provides the movable portion 301b with a force F1 in the upper direction since one end of the member is fixed at the fixing portion of the arm and finger portion 731 and the other end thereof is fixed at the movable portion 301b. 303 is a wire fixing portion for fixing a wire 304. 305 is a tension pulley which provides tension to the wire 304, wherein 305a is a pulley shuttle rotatably supporting the tension pulley 305. 306 is a winding pulley for winding the wire 304 in order to apply an adequate force on to the movable portion 301b. 307 is a resilient member such as a spring, rubber, etc., having one end thereof fixed and the other end thereof fixed at the pulley shuttle 305a. 308 is a potentiometer pulley which rotates an axis of a potentiometer 309 as a variable resister. 310 is a wire having one end thereof fixed at the pulley shuttle 305a and the other end thereof fixed at the resilient member 311.

In FIG. 20, 623 is an arm operating portion of an operator as in FIG. 10. 624 is a finger operating portion of an operator as in FIG. 10. 624a is a reaction force generating portion which provides the finger operating portion 624 of an operator with a reaction force. 401 is a moving pulley which moves left and right in a range from the position P1 to the position P2 in compliance with movements of the finger portion of the operator. 402 is a fixing pulley. 403 is a wire having one end thereof fixed at the moving pulley 401 and the other end fixed at a friction plate 404 made of a synthetic resin. 405 is a spring having one end thereof fixed and the other end thereof fixed at a nipping plate 406 made of a magnetic body. 407 is a pressing plate to press the friction plate 404. 408 is an electromagnetic rod which constitutes an electromagnet 410. 409 is a coil which constitutes an electromagnet 410.

First, using FIG. 19, a description is given of the detection principle of a finger reaction force.

As the wire 304 is wound on the winding pulley 306, the movable portion 301b moves downward by a force F2 against a force F1 of the resilient member 302. The greater the amount of winding the wire 304 by the winding pulley 306 becomes, the greater the force F2 becomes to resist the force F1 of the resilient member 302, and the greater the rotating angle of the movable portion 301b becomes. As the force F2 becomes greater, the tension of the wire 304 is also made greater, whereby a force F3 in the left direction functions, via the wire 304, on the tension pulley 305 which is balanced by the resilient members 307 and 311, whereby the potentiometer 308 turns. In line therewith, the potentiometer 309 also turns, and the resistance value thereof changes. That is, a tension (for example, in the case where the movable portion 301b is a finger, a direction along which the rotating angle becomes large is the direction for grasping an object) suited to a rotating angle of the movable portion 301b is applied to the wire 304, and a resistance value suited to the tension of the wire 304 can be obtained by the potentiometer 309. The resistance value is converted to a voltage value at the finger motor of the motor portion 722 and is outputted to the robot control portion 711, whereby the voltage value is transmitted to the remote control apparatus 1A via a PHS line as, for example, a finger reaction force data.

Next, using FIG. 20, a description is given of a finger loaded motion based on the finger reaction force data.

In the remote control apparatus 1A which received the finger reaction force from the robot apparatus 2A, the finger reaction force data are inputted into the operation control portion 611 via the PHS device 631 and input/output interface portion 612. The finger reaction force data from the operation control portion 611 is converted to a control voltage value responsive to the finger reaction force data by the D/A converter 616, whereby a control current a responsive to the finger reaction force data is caused to flow to the coil 409 of the reaction force generating portion 624a of the arm operating portion 623, and a force F4 responsive to the value of the control current a is applied to the pressing plate 407 by the electromagnetic rod 408. That is, the force F4 responsive to the tension of the wire 304 in FIG. 19 is applied to the pressing plate 407, and a friction force responsive to the tension of the wire 304 is generated at the friction plate 404. As a large friction force is generated at the friction plate 404, the force to move the wire 403 becomes large. Finally, the force (load force) applied to a finger via the moving pulley to operate the finger operating portion is increased. Thus, it is possible to control the finger load force (finger reaction force) at the finger operating portion.

Also, in this preferred embodiment, a description was given of a PHS device as an example of a mobile transmission device. However, the invention is not limited to this example. It is also applicable to a portable telephone set. Therefore, if such a portable telephone set can be used for communications or transmissions with foreign countries via an international transmission line, remote control of a robot apparatus can be internationally carried out.

As described above, according to the preferred embodiment, the remote control apparatus 1A includes an operating apparatus 62 having a head portion operating portion 621, an arm and finger operating portion 623 and a travel operating portion 626 which, respectively, operate the head portion 723, the arm and finger portion 731 consisting of arms and fingers, and the travel portion 729 of the robot apparatus 2A; a first computer 61 for generating operation data in compliance with the amount of operation at the operating apparatus 62; and a first mobile transmission device 63 for transmitting the operation data from the first computer 61 to the base station LS1 connected to a public communications network N, and the robot apparatus 2A includes a second mobile transmission device 73 for receiving the operation data from the base station LS2 connected to the public communications network N; a second computer 71 for generating control data for the head portion 723, arm and finger portion 731 and travel portion 729 based on the operation data; and a robot mechanism portion 72 for providing motions to the head portion 723, arm and finger portion 731 and travel portion 729 by driving the head portion motor 724, arm and finger motor 732 and travel motor 730, which are incorporated in the motor portion 722, on the basis of the control data. Thereby, since operation data from the remote control apparatus 1A can be transmitted via the mobile transmission device 63, the robot apparatus 2A receives the operation data, converts the same to control data, and causes the head portion 723, arm and finger portion 731 and travel portion 729 of the robot mechanism portion to move on the basis of the control data.

Further, the robot mechanism portion 72 is provided with an arm and finger position detecting portion 733 in the arm and finger portion, which detects the present arm position and present finger position; a head position detecting portion 725 in the head portion 723, which detects the present head position; and a finger reaction force detecting portion 734 for detecting the reaction force at the finger portion in the arm and finger portion 731; and the second computer 71 controls the positions of the arm and finger portion 731 including the finger portion and the head portion 723 on the basis of the present arm position, present finger position and present head position, and transmits the detected reaction force, being a reaction force detected by the finger reaction force detecting portion 734, to the remote control apparatus 1A via the second mobile transmission device 73. The first computer 61 provides a load to the finger operating portion 624 in the arm operating portion 623 on the basis of the detected reaction force received via the first mobile transmission device 63, whereby the head portion 723 and arm and finger portion 731 are feedback-controlled to cause the positions thereof to be accurately controlled, and it is possible to carry out finger operations with a real sense of feeling by controlling the load of the finger operating portion 624 on the basis of the reaction force at the finger portion.

Industrial Applicability

As described above, a robot remote control system according to the first aspect of the invention is a robot remote control system comprising a remote control apparatus for remotely controlling a robot and a robot apparatus controlled on the basis of data transmitted from the remote control apparatus; wherein the remote control apparatus comprises a first computer which generates control data for the robot apparatus; and a first mobile transmission device which transmits the control data to a base station connected to the public communications network; and the robot apparatus comprises a second mobile transmission device for receiving the control data which is transmitted from the base station connected to the public communications network; and a second computer for processing the control data and for controlling a robot mechanism. Therefore, since it is possible to transmit control data from the remote control apparatus via a mobile transmission device, such an advantageous effect can be obtained, by which even though a robot apparatus is installed anywhere at least in Japan, the robot apparatus can be controlled.

A robot remote control system according to the second aspect of the invention is a robot remote control system comprising a robot remote control portion; a robot control portion; and a robot mechanism portion controlled by the robot control portion; wherein the robot remote control portion comprises a first computer for generating action codes to instruct action instructions to the robot control portion; a first data transmission card for converting the action codes, outputted from the first computer, to wireless transmission data; and a first mobile transmission device for transmitting the wireless transmission data via an antenna as electric wave signals; and the robot control portion consists of a second mobile transmission device for receiving the electric wave signals via an antenna and outputting the wireless transmission data; a second data transmission card for converting the wireless transmission data to the action codes; a second computer for receiving the action codes from the second data transmission card and outputting the same action codes; a robot sequencer control portion for providing motions to the robot mechanism portion which carries out forward or backward actions or left- or right-turning actions, on the basis of the action codes outputted from the second computer. Therefore, action instruction signals from the robot remote control portion are transmitted via the mobile transmission device (for example, a PHS device). And, since action instructions can be provided anywhere as far as electric wave signals of the mobile transmission device can reach, it is possible to control the robot mechanism portion by the robot remote control portion even though the robot control portion and robot mechanism portion, which are objects to be controlled, are installed anywhere. For example, such an advantageous effect can be obtained, by which it is possible to attend the handicapped from a remote location.

In a robot remote control system according to the third aspect of the invention, in addition to the robot remote control systems according to the first or second aspects of the invention, the first computer comprises an input device for inputting an action instruction provided for the robot control portion; a RAM for storing data; a ROM for storing programs and data; a central processing unit for converting the action instruction to the action code; a display for displaying the action instruction and the action code; and an interface portion for outputting the action code to peripheral devices. Therefore, such an advantageous effect can be obtained in addition to the effects obtained by the robot remote control systems according to the first and second aspects of the invention, by which it is possible to automatically control the robot mechanism portion by the robot control portion if action instructions are inputted via an input device.

In a robot remote control system according to the fourth aspect of the invention, in addition to the robot remote control system according to the third aspect of the invention, the central processing unit has an action code retrieving means which retrieves an action code in a action code table, in which the action code corresponding to the action instruction is stored, when the action instruction is provided, and reads out the retrieved action code therefrom. Therefore, such an advantageous effect can be obtained, by which the robot mechanism portion can be automatically controlled in addition to the effects obtained in robot remote control systems according to the first or second aspects of the invention since action codes are automatically generated by inputting action instructions.

In a robot remote control system according to the fifth aspect of the invention, in addition to the robot remote control system according to the second aspect of the invention, the robot sequencer control portion has an action instruction retrieving means which retrieves an action instruction in an action instruction table, in which the action instruction corresponding to the action code is stored, when the action code is inputted, and reads out the retrieved action instruction. Therefore, such an advantageous effect can be obtained, by which the robot sequencer control portion can automatically control the robot mechanism portion, in addition to the effects obtained by the robot remote control system according to the second aspect of the invention.

A robot remote control system according to the sixth aspect of the invention is a robot remote control system having a remote control apparatus and a robot apparatus, wherein the remote control apparatus comprises an operation apparatus including a head portion operating portion, an arm operating portion and a travel operating portion which, respectively, operate the head portion, arm and finger portion and travelling portion of the robot apparatus; a first computer for generating operation data corresponding to an amount of operation in the operation apparatus; and a first mobile transmission device for transmitting the operation data from the first computer to a base station connected to the public communications network; the robot apparatus comprises a second mobile transmission device for receiving the operation data from the base station connected to the public communications network; a second computer for generating control data for the head portion; arm and finger portion and travel portion on the basis of the operation data; and a robot mechanism portion for providing actions to the head portion, arm and finger portion and travel portion by driving a head portion motor, an arm and finger motor, and a travel motor in a motor portion on the basis of the control data. Therefore, since operation data from the remote control apparatus can be transmitted via a mobile transmission device, the robot apparatus receives the operation data and converts the same to control data, whereby such an advantageous effect can be obtained, by which the head portion, arm and finger portion and travel portion of the robot mechanism can be operated on the basis of the control data.

According to a robot remote control system of the seventh aspect of the invention, in the robot remote control system according to the sixth aspect of the invention, the robot mechanism portion has an arm and finger position detecting portion in the arm and finger portion, for detecting the present arm position and present finger position, a head position detecting portion in the head portion for detecting the present head position, and a finger reaction detecting portion for detecting a reaction force at a finger portion in the arm and finger portion; the second computer controls the positions of the arm and finger portion including the finger portion and the head portion on the basis of the present arm position, present finger position and present head position, and at the same time transmits the detected reaction force, which is a reaction force detected by the reaction force detecting portion, to the remote control apparatus via the second mobile transmission device; and the first computer provides the finger operating portion in the arm and finger operating portion with a load on the basis of the detected reaction force received via the first mobile transmission device. Therefore, in addition to the effects obtained the robot remote control system according to the sixth aspect of the invention, the robot remote control system is advantageous in that the positions of the head portion and the arm and finger portion can be accurately controlled by feedback control, and finger operations accompanying a real sense of feeling can be carried out by controlling the load of the finger operating portion on the basis of the reaction force at the finger portion.

A robot image remote control processing system according to the eighth aspect of the invention; is a robot image remote control processing system comprising a robot remote control system and an image remote processing system, wherein the robot remote control system has a robot remote control portion, a robot control portion, and a robot mechanism portion controlled by the robot control portion, and the image remote processing system has an image remote control portion and an image processing unit; the robot remote control portion has a first computer for generating action codes to provide action instructions to the robot control portion, and, simultaneously, control codes to control the image processing unit; a first data transmission card for converting the action codes and the control codes, which are outputted from the first computer, to first wireless transmission data, and a first mobile transmissions device which transmits the first wireless transmission data via an antenna as the first electric wave signals; and the robot control portion has a second mobile transmission device for receiving the first electric wave signals via an antenna and outputting the first wireless transmission data; a second data transmission card for converting the first wireless transmission data to the action codes and the control codes; a second computer for outputting the action codes and control codes by inputting the action codes and control codes from the second data transmission card; and a robot sequencer control portion for providing motions to the robot mechanism portion, which carries out forward or backward motions and left- and right-turning actions, etc., on the basis of the action codes outputted from the second computer, and at the same time, for outputting the control codes, as they are, which are outputted from the second computer; and the robot mechanism portion has a plurality of cameras for photographing the surrounding objects and outputting these as analog image signals; and an image selecting portion for selecting and outputting analog image signals from the plurality of cameras on the basis of control codes outputted from a robot sequencer control portion of the robot control portion; the image remote control portion has an image sound converting portion for converting analog sound signals to digital sound signals or vice verse, and converting digital image signals to analog image signals; a third computer for outputting image transmission instruction data along with inputting and outputting digital sound signals and digital image signals; a third data transmission card for converting digital sound signals and image transmission instruction data outputted from the third computer to second wireless transmission data; and a third mobile transmission device for transmitting the second wireless transmission data via an antenna as second electric wave signals; and the image processing unit has a fourth mobile transmission device for outputting the second wireless transmission data upon receiving the second electric wave signals via an antenna; a fourth data transmission card for converting digital image signals to the third wireless transmission data along with converting the second wireless transmission data to digital sound signals; a fourth computer for outputting digital image signals along with inputting and outputting digital sound signals from the fourth data transmission card; an image sound converting portion for converting analog image signals from the image selecting portion to digital image signals and outputting the same to the fourth computer along with converting digital sound signals outputted from the fourth computer to analog sound signals or analog sound signals from a microphone to digital sound signals. Therefore, action instruction signals from the robot remote control portion are transmitted via a mobile transmission device (for example, a PHS device), and it is possible to control the robot mechanism portion by the robot remote control portion even though the robot control portion and robot mechanism portion to be controlled are installed anywhere. Accordingly, for example, it is possible to attend the handicapped from a remote location, and at the same time, it is possible to automatically transmit image signals from the image processing unit to the image remote control portion and to automatically display the same on an image monitor. Accordingly, it is possible to monitor the states and/or conditions of the sick or handicapped, and since either one of a plurality of cameras installed at the robot mechanism portion can be selected, the image can be monitored. It is therefore possible to monitor images from various locations.

A robot image remote control processing system according to the ninth aspect of the invention is a robot image remote control processing system according to the sixth aspect of the invention, wherein the plurality of cameras are placed at the head portion, leg portion and hand portion of the robot mechanism portion. Accordingly, in addition to the effects obtained in the image remote control processing system according to the eighth aspect of the invention, such advantageous effects can be obtained, by which it is possible to monitor images from the head portion, leg portion and hand portion of the robot mechanism portion.

What is claimed is:

1. A robot remote control system comprising a remote control apparatus for remotely controlling a robot and a robot apparatus controlled on the basis of data transmitted from said remote control apparatus;

wherein said remote control apparatus comprises a first computer which generates control data for said robot apparatus; and a first mobile transmission device which transmits said control data to a base station connected to a public communications network; and said robot apparatus comprises a second mobile transmission device for receiving said control data which is transmitted from the base station connected to the public communications network; and a second computer for processing said control data and for controlling a robot mechanism.

2. A robot remote control system comprising a robot remote control portion; a robot control portion; and a robot mechanism portion controlled by said robot control portion;

wherein said robot remote control portion comprises a first computer for generating action codes to instruct action instructions to said robot control portion; a first data transmission card for converting said action codes, outputted from said first computer, to wireless transmission data; and a first mobile transmission device for transmitting said wireless transmission data via an antenna as electric wave signals; and said robot control portion comprises a second mobile transmission device for receiving said electric wave signals via an antenna and outputting said wireless transmission data; a second data transmission card for converting said wireless transmission data to said action codes; a second computer for receiving said action codes from said second data transmission card and outputting the same action codes; a robot sequencer control portion for providing motions to said robot mechanism portion which carries out forward or backward actions or left- or right-turning actions, on the basis of said action codes outputted from said second computer.

3. A robot remote control system as set forth in claim 1 or 2, wherein said first computer comprises an input device for inputting an action instruction provided for said robot control portion; a RAM for storing data; a ROM for storing programs and data; a central processing unit for converting said action instruction to said action code; a display for displaying said action instruction and said action code; and an interface portion for outputting said action code to peripheral devices.

4. A robot remote control system as set forth in claim 3, wherein said central processing unit has an action code retrieving means which retrieves an action code in an action code table, in which said action code corresponding to said action instruction is stored, when said action instruction is provided, and reads out said retrieved action code therefrom.

5. A robot remote control system as set forth in claim 2, wherein said robot sequencer control portion has an action instruction retrieving means which retrieves an action code in an action instruction table, in which said action instruction corresponding to said action code is stored, when said action code is inputted, and reads out said retrieved action instruction.

6. A robot remote control system having a remote control apparatus and a robot apparatus, wherein said remote control apparatus comprises an operation apparatus including ahead portion operating portion, an arm operating portion and a travel operating portion which, respectively operate the head portion, arm and finger portion and travelling portion of said robot apparatus; a first computer for generating operation data corresponding to an amount of operation in said operation apparatus; and a first mobile transmission device for transmitting said operation data from said first computer to a base station connected to a public communications network;

said robot apparatus comprises a second mobile transmission device for receiving said operation data from the base station connected to a public communications network; a second computer for generating control data for said head portion; arm and finger portion and travel portion on the basis of said operation data; and a robot mechanism portion for providing actions to said head portion, arm and finger portion and travel portion by driving a head portion motor, an arm and finger motor, and a travel motor in a motor portion on the basis of said control data.

7. A robot remote control system as set forth in claim 6, wherein said robot mechanism portion has an arm and finger position detecting portion in said arm and finger portion, for detecting the present arm position and present finger position, a head position detecting portion in said head portion for detecting the present head position, and a finger reaction detecting portion for detecting a reaction force at a finger portion in said arm and finger portion; said second computer controls the positions of the arm and finger portion including said finger portion and said head portion on the basis of the present arm position, present finger position and present head position, and at the same time transmits the detected reaction force, which is a reaction force detected by said reaction force detecting portion, to said remote control apparatus via said second mobile transmission device; and said first computer provides the finger operating portion in said arm and finger operating portion with a load on the basis of said detected reaction force received via said first mobile transmission device.

8. A robot image remote control processing system comprising a robot remote control system and an image remote processing system, wherein said robot remote control system has a robot remote control portion, a robot control portion, and a robot mechanism portion controlled by said robot control portion, and said image remote processing system has an image remote control portion and an image processing unit;

said robot remote control portion has a first computer for generating action codes to provide action instructions to said robot control portion, and, simultaneously, control codes to control said image processing unit; a first data transmission card for converting said action codes and said control codes, which are outputted from said first computer, to first wireless transmission data; and a first mobile transmission device which transmits the first wireless transmission data via an antenna as the first electric wave signals, and said robot control portion has a second mobile transmission device for receiving said first electric wave signals via an antenna and outputting said first wireless transmission data; a second data transmission card for converting said first wireless transmission data to said action codes and said control codes; a second computer for outputting said action codes and control codes by inputting the action codes and control codes from said second data transmission card; and a robot sequencer control portion for providing motions to said robot mechanism portion, which carries out forward or backward motions and left- and right-turning actions, etc., on the basis of said action codes outputted from said second computer, and at the same time, for outputting said control codes, as they are, which are outputted from said second computer; and said robot mechanism portion has a plurality of cameras for photographing the surrounding objects and outputting these as analog image signals; and an image selecting portion for selecting and outputting analog image signals from said plurality of cameras on the basis of control codes outputted from a robot sequencer control portion of said robot control portion;

said image remote control portion has an image sound converting portion for converting analog sound signals to digital sound signals or vice versa, and converting digital image signals to analog image signals; a third computer for outputting image transmission instruction data along with inputting and outputting digital sound signals and digital image signals; a third data transmission card for converting digital sound signals and image transmission instruction data outputted from said third computer to second wireless transmission data; and a third mobile transmission device for transmitting said second wireless transmission data via an antenna as second electric wave signals; and said image processing unit has a fourth mobile transmission device for outputting said second wireless transmission data upon receiving said second electric wave signals via an antenna; a fourth data transmission card for converting digital image signals to the third wireless transmission data along with converting said second wireless transmission data to digital sound signals; a fourth computer for outputting digital image signals along with inputting and outputting digital sound signals from said fourth data transmission card; an image sound converting portion for converting analog image signals from said image selecting portion to digital image signals and outputting the same to the fourth computer along with converting digital sound signals outputted from said fourth computer to analog sound signals or analog sound signals from a microphone to digital sound signals.

9. A robot image remote control processing system as set forth in claim 8, wherein said plurality of cameras are placed at the head portion, leg portion and hand portion of said robot mechanism portion.

* * * * *